United States Patent
Jang et al.

(10) Patent No.: US 10,101,904 B2
(45) Date of Patent: Oct. 16, 2018

(54) MOBILE TERMINAL DISPLAYING EXECUTION SCREENS FOR FUNCTIONS EXECUTING IN THE BACKGROUND

(71) Applicant: LG ELECTRONICS INC., Seoul (KR)

(72) Inventors: Yujune Jang, Seoul (KR); Suhjin Yi, Seoul (KR); Jungmin Lee, Seoul (KR); Seungmin Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 207 days.

(21) Appl. No.: 15/134,077

(22) Filed: Apr. 20, 2016

(65) Prior Publication Data

US 2017/0038964 A1 Feb. 9, 2017

(30) Foreign Application Priority Data

Aug. 4, 2015 (KR) .................... 10-2015-0110242

(51) Int. Cl.
*G06F 3/0482* (2013.01)
*G06F 3/0488* (2013.01)
(Continued)

(52) U.S. Cl.
CPC ........ *G06F 3/04883* (2013.01); *G06F 3/0482* (2013.01); *G06F 3/0486* (2013.01); *G06F 3/0488* (2013.01); *G06F 3/04886* (2013.01); *H04M 1/673* (2013.01); *H04M 1/72566* (2013.01); *H04M 1/72583* (2013.01); *H04W 88/02* (2013.01); *H04M 2250/22* (2013.01)

(58) Field of Classification Search
None
See application file for complete search history.

(56) References Cited

U.S. PATENT DOCUMENTS 9,690,621 B2 *   6/2017   Kim ................... G06F 9/4881
2007/0083827 A1 *   4/2007   Scott .................. G06F 9/4443
                                                                     715/811

(Continued)

FOREIGN PATENT DOCUMENTS

EP            1465389           10/2004

OTHER PUBLICATIONS

European Patent Office Application No. 16001080.7, Search Report dated Dec. 5, 2016, 10 pages.

(Continued)

*Primary Examiner* — Asher D Kells
(74) *Attorney, Agent, or Firm* — Lee Hong Degerman Kang & Waimey

(57) ABSTRACT

The present disclosure relates to a mobile terminal and a control method thereof, and the mobile terminal may include a display unit, a sensing unit configured to sense a predetermined user's touch input, and a controller configured to execute at least one function according to the user's mobile terminal use pattern corresponding to a time point at which the touch input is applied, wherein the controller displays at least one graphic object corresponding to the executed function in response to the touch input, and displays an execution screen of a function corresponding to any one of the displayed graphic objects according to the user's selection on the display unit.

17 Claims, 14 Drawing Sheets

(51) Int. Cl.
    *H04M 1/673*     (2006.01)
    *H04M 1/725*     (2006.01)
    *G06F 3/0486*     (2013.01)
    *H04W 88/02*     (2009.01)

(56) References Cited

U.S. PATENT DOCUMENTS

| | | | |
|---|---|---|---|
| 2013/0014040 A1 | 1/2013 | Jagannathan et al. | |
| 2013/0053105 A1 | 2/2013 | Lee et al. | |
| 2013/0174179 A1* | 7/2013 | Park | G06F 9/4843 |
| | | | 718/107 |
| 2013/0187753 A1 | 7/2013 | Chiriyankandath | |
| 2013/0198506 A1 | 8/2013 | Smith et al. | |
| 2014/0208269 A1* | 7/2014 | Boyana | H04M 1/66 |
| | | | 715/835 |
| 2014/0372356 A1* | 12/2014 | Bilal | G06F 9/445 |
| | | | 706/46 |
| 2015/0087275 A1 | 3/2015 | Brisebois | |
| 2016/0357362 A1* | 12/2016 | Gauci | G06N 5/04 |
| 2016/0360271 A1* | 12/2016 | Magahern | H04N 21/4668 |
| 2017/0242538 A1* | 8/2017 | Chaudhri | G06F 3/0416 |
| 2018/0046498 A1* | 2/2018 | Park | G06F 9/4843 |
| 2018/0081713 A1* | 3/2018 | Park | G06F 3/0483 |

OTHER PUBLICATIONS

European Patent Office Application No. 16001080.7, Office Action dated Jun. 4, 2018, 11 pages.

\* cited by examiner

MOBILE TERMINAL DISPLAYING EXECUTION SCREENS FOR FUNCTIONS EXECUTING IN THE BACKGROUND

CROSS-REFERENCE TO RELATED APPLICATIONS

Pursuant to 35 U.S.C. § 119(a), this application claims the benefit of earlier filing date and right of priority to Korean Application No. 10-2015-0110242, filed on Aug. 4, 2015, the contents of which is incorporated by reference herein in its entirety.

BACKGROUND OF THE INVENTION

1. Field of the Invention

The present disclosure relates to a mobile terminal and a control method thereof.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

On the other hand, as the functions of a terminal have been diversified as described above, studies on a method of allowing a user to more quickly search his or her desired function, and more quickly executing a user's desired function have been actively carried out.

SUMMARY OF THE INVENTION

An aspect of the present disclosure is to solve the foregoing and other problems, and the objective of the present disclosure is to provide a mobile terminal capable of allowing a user to more easily and quickly select his or her desired function, and allowing the user to more quickly using his or her selected function, and a control method thereof.

Another aspect of the present disclosure is to provide a mobile terminal capable of allowing a screen associated with the execution of a function of the mobile terminal primarily used at a specific time to be immediately displayed according to a user's selection and a control method thereof.

In order to accomplish the foregoing or other objectives, according to an aspect of the present disclosure, a mobile terminal according to the present disclosure may include a display unit, a sensing unit configured to sense a predetermined user's touch input, and a controller configured to execute at least one function according to the user's mobile terminal use pattern corresponding to a time point at which the touch input is applied, wherein the controller displays at least one graphic object corresponding to the executed function in response to the touch input, and displays an execution screen of a function corresponding to any one of the displayed graphic objects according to the user's selection on the display unit.

According to an embodiment, when the touch input is sensed, the controller may execute at least one of functions executable on the mobile terminal in response to the sensed touch input based on a frequency at which the at least one function is executed at a time point at which the touch input is applied.

According to an embodiment, the ranking or location at which the at least one graphic object is displayed on the display unit may be determined according to a recommendation ranking set to the corresponding function, and the recommendation ranking may be determined according to a frequency at which the at least one function is executed at a time point at which the touch input is applied as a result of analyzing the user's mobile terminal use pattern.

According to an embodiment, when the predetermined touch input is sensed, the controller may display an execution screen of any one of the executed at least one function with the highest recommendation ranking set thereto on the display unit.

According to an embodiment, the controller may change a screen displayed on the display unit to an execution screen of a function according to a next recommendation ranking of a function for which the execution screen is displayed on the display unit among the executed at least one function based on the user's predetermined another touch input.

According to an embodiment, the predetermined touch input may be a user's input to a specific key provided in the mobile terminal, and the specific key may be any one of a hard key or soft key provided in the mobile terminal.

According to an embodiment, when at least one function is executed according to an input of the specific key and an execution screen of at least one of the executed functions is displayed on the display unit, the controller may change a screen displayed on the display unit to an execution screen of any one of the executed at least one function according to a number of times in which the specific key is entered.

According to an embodiment, when the specific key is entered again in a state that an execution screen of any one of the executed at least one function is displayed on the display unit according to an input of the specific key, the controller may display a graphic if) object corresponding to an execution screen of the executed at least one function, respectively, on at least part of the display unit.

According to an embodiment, when the specific key is entered a plural number of times in a state that the at least one graphic object is displayed on the display unit, the controller may display a graphic object corresponding to the number of times in which the specific key is entered in a distinct manner from other graphic objects.

According to an embodiment, the controller may display the re-entered specific key to be displayed in a distinct manner from prior to entering the specific key again to allow the mobile terminal to indicate that a screen displayed on the display unit according to an input of the specific key is in a state that can be changed to an execution screen of another function.

According to an embodiment, the controller may display a lock screen for receiving a user's input for releasing a locked state on the display unit when the mobile terminal is in the locked state in which the execution of at least one executable function is limited, and display a graphic object corresponding to any one of the at least one function on the display unit while the user's input for releasing the locked state is applied when the user's input corresponds to the predetermined touch input.

According to an embodiment, when a predetermined drag trajectory is entered to release the locked state, the controller may display a graphic object corresponding to the any one function on the display unit according to the drag input trajectory while a touch input for entering the drag trajectory is applied to the display unit, and the graphic object may move along according to the user's touch input position moving to apply the drag trajectory.

According to an embodiment, when the user's input corresponds to the predetermined touch input, the controller may display a graphic object corresponding to any one of the executed at least one function based on a period of time for which the user's input is held at one position of the display unit.

According to an embodiment, a function for which the execution screen is displayed on the display unit may be executed in a foreground state, and other functions excluding the function for which the execution screen is executed in the foregoing state among the at least one function may be executed in a background state.

According to an embodiment, when a predetermined period of time has passed, the controller may end the functions executed in the background.

According to an embodiment, when the predetermined touch input is sensed, the controller may execute at least one of functions associated with a function for which the execution screen is displayed on the display unit according to the user's mobile terminal use pattern corresponding to a time point at which the touch input is sensed, and the associated function may include a function that is the same or similar to the function for which the execution screen is displayed on the display unit or at least one of services provided through or the function for which the execution screen is displayed on the display unit.

According to an embodiment, the user's mobile terminal use pattern may be formed based on a record in which the user has executed each function of the mobile terminal for each time according to a predetermined time interval for a predetermined period of time, and may include information on a frequency at which each function of the mobile terminal has been executed for the each time.

According to an embodiment, the controller may display the at least one graphic object adjacent to one position of the display unit at which the predetermined touch input is sensed.

According to an embodiment, the at least one function may be a service provided through any one of functions executable on the mobile terminal and a function executed through an application or program installed in the mobile terminal.

In order to accomplish the foregoing or other objectives, according to an aspect of the present disclosure, a control method of the mobile terminal according to an embodiment of the present disclosure may include sensing a predetermined touch input, executing at least one function executable on the mobile terminal according to a time point at which the predetermined touch input is sensed and a user's mobile terminal use pattern, displaying at least one graphic object corresponding to the executed at least one function on the display unit of the mobile terminal, and displaying an execution screen of a function corresponding to any one of the at least one graphic object on the display unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
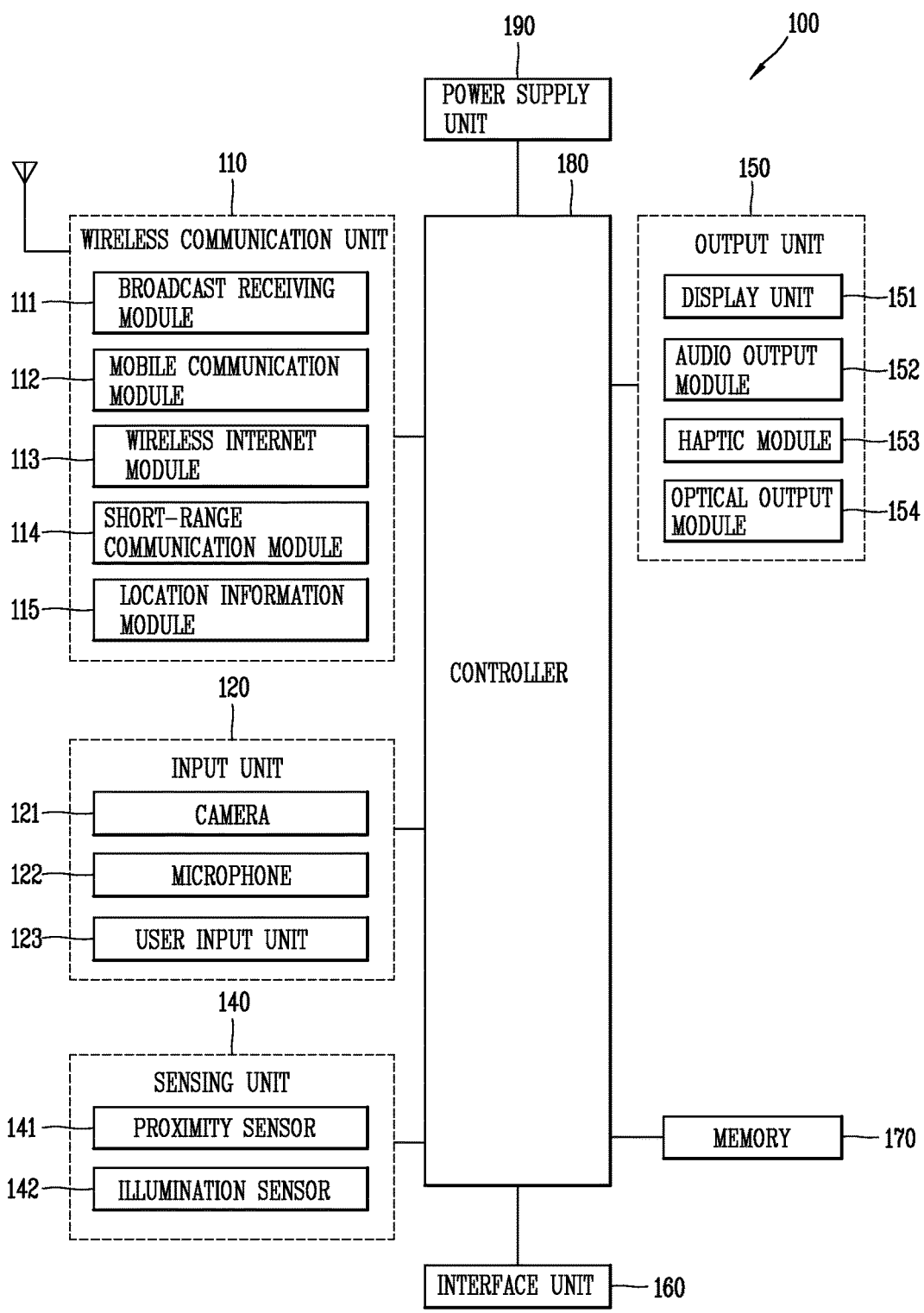
FIG. 1A is a block diagram for explaining mobile terminal associated with present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes in addition to the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it will be obvious to those skilled in the art that the present invention may be also applicable to a fixed terminal such as a digital TV, a desktop computer and a digital signage, except for specific configurations for mobility.

Figure 1B:
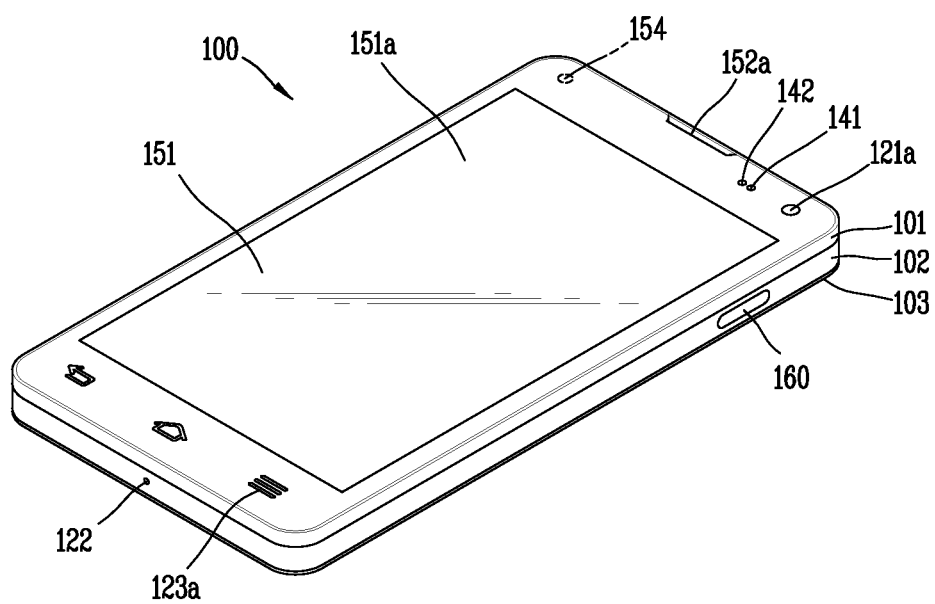
FIGS. 1B and 1C are conceptual views illustrating an example in which a mobile terminal associated with the present disclosure is seen from different directions.
Figure 1C:
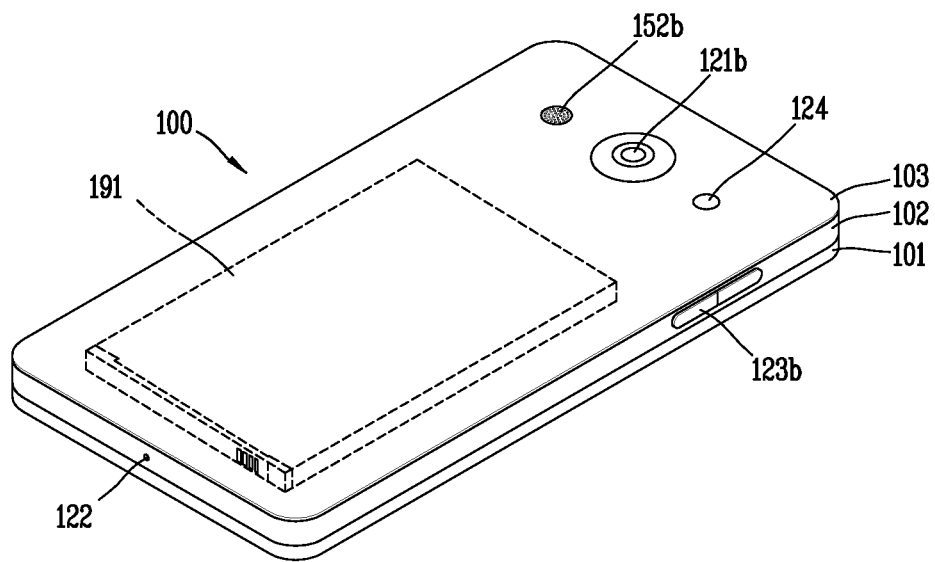

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific portion of the display unit 151, or convert capacitance occurring at a specific portion of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or if) between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (refer to FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, preferred embodiments related to a control method which can be implemented in the mobile terminal 100 will be explained in more detail with reference to the attached drawings. It is obvious to those skilled in the art that the present features can be embodied in several forms without departing from the characteristics thereof.

Figure 2:
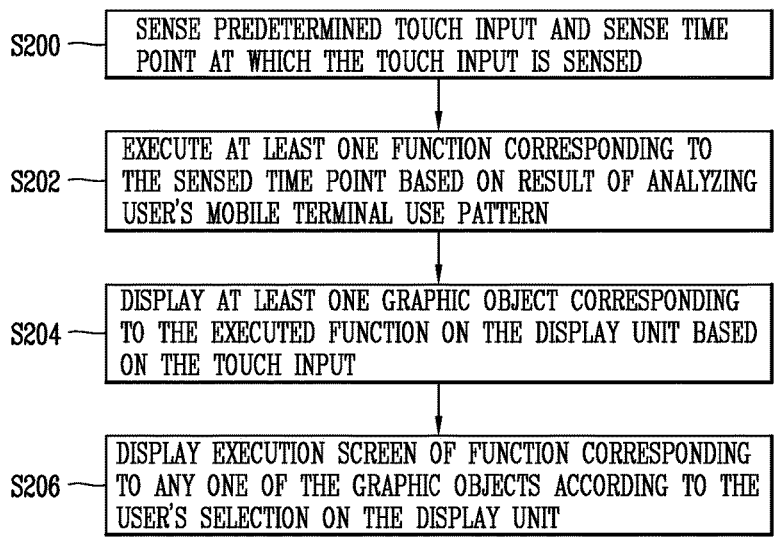
FIG. 2 is a flow chart illustrating an operation process of executing at least one function according to a user's touch input and displaying an execution screen for any one of the executed functions on a mobile terminal associated with the present disclosure.

First, FIG. 2 is a flow chart illustrating an operation process of executing at least one function according to a user's touch input and displaying an execution screen for any one of the executed functions on a mobile terminal associated with the present disclosure.

Referring to FIG. 2, when a predetermined touch input is sensed, the controller 180 of the mobile terminal 100 according to an embodiment of the present disclosure may sense a time point at which the touch input (S200). The predetermined touch input may be set in various ways. For an example, the touch input may be a touch input applied to a predetermined specific position of the display unit 151 or a touch input applied for more than a predetermined period of time. Otherwise, the touch input may be a touch input concurrently or sequentially applied by a plurality of touch objects (for example, a user's fingers).

On the other hand, the touch input may include a drag trajectory applied in a specific direction or by a specific length. In other words, the controller 180 may sense the application of the "predetermined touch input" when a drag input applied in a predetermined direction or above a predetermined length is applied from one position of the display unit 151 to which the touch input is initially applied during the process S200.

On the other hand, the drag input may be an input for which the start point and the end point thereof are previously determined. In other words, when a drag input for which its input is started from a predetermined position of the display unit 151 (for example, one position of a bezel on the display unit) or ended at a predetermined position is applied, the controller 180 may sense the predetermined touch input being applied. The "predetermined touch input" may be previously set by the user.

Furthermore, when it is determined during the step S200 that the sensed user's touch input is a predetermined touch input, the controller 180 may sense a time point at which the touch input is applied.

Furthermore, when a predetermined touch input and a time point at which the touch input is applied are sensed during the step S200, the controller 180 may execute at least one function according to the sensed time point during the step S200 (S202).

For example, the controller 180 may execute at least one predetermined functions corresponding to a time point at which the predetermined touch input is sensed during the step S200 among the functions of the mobile terminal 100 during the step S202. Here, the executed "functions" of the mobile terminal 100 may be various. For example, the "function" may include a basic function that can be provided from the mobile terminal 100, namely, incoming or outgoing of a call or message, functions as well as wireless communication or photo and video capture through a camera, voice recording, playback of a music file, and functions of displaying an image or video. Furthermore, the "function" may be provided through a program or application and the like installed in the mobile terminal 100.

In addition, the "function" may be any one of services provided through the "function" of the mobile terminal 100. For example, the "function" may merely denote a function of accessing the Internet, but a service for accessing a specific webpage through the Internet may be the "function." Otherwise, the "function" may merely denote a social network service (SNS) function, but a service for providing chatting with a plurality of groups or a specific figure included in the SNS may be the "function."

On the other hand, the controller 180 may determine the at least one "function" to be executed according to a time point at which the predetermined touch input is sensed based on a predetermined condition. Here, the predetermined condition may be determined in various ways. For example, the predetermined condition may be at least one of a frequency at which a specific function is used at the relevant time point, a user's preference and a function currently being executed on the mobile terminal 100.

For an example, the controller 180 may record log information on the executed function whenever a specific function of the mobile terminal 100 is executed and ended. In other words, the log information may include information on a time point at which each function is executed, a time point at which each function is ended, and a period of time for which the each function is driven. Furthermore, the controller 180 may determine whether a specific function has been only executed but neglected or the user has controlled the specific function during the execution of the specific function according to whether or not there is a user's manipulation associated with the specific function being executed while executing a specific function.

For an example, the controller 180 may sense whether there is a touch input associated with the executed function in a state that a screen associated with the executed function is displayed on the display unit 151 during the execution of the function. Furthermore, when there has been a touch input, the controller 180 may sense a number of times in which the touch input is applied, a frequency according to a predetermined time interval, and the like. Furthermore, the controller 180 may determine whether or not there is a user's manipulation for the executed specific function according to the sensed result. Furthermore, information associated with the user's manipulation or non-manipulation or the like may be further included in the log information. In this case, even though any function is executed at the same time, a function determined that has been directly manipulated by the user may be preferentially selected as a "function" to be executed over a function determined that has not been directly manipulated by the user according to a time point at which the predetermined touch input is sensed.

In addition, the controller 180 may determine at least one "function" executed during the step S202 based on a user's preference set to a specific function or a function for which the execution screen is currently displayed on the display unit 151 of the mobile terminal 100. An operation process of executing the at least one "function" based on a user's predetermined preference or a function for which the execution screen is currently displayed on the display unit 151 as well as a time point at which the predetermined touch input is sensed as described above will be described in more detail with reference to the following FIGS. 3 and 4.

On the other hand, the controller 180 may analyze the frequencies of the functions of the mobile terminal 100 executed for each time based on the log information of the each function. In other words, the controller 180 may calculate a frequency, namely, use frequency, at which a user has executed the function of the mobile terminal 100 for each time, and analyze and gather a use frequency for the each function to form the user's mobile terminal use pattern. An operation process of forming a user's mobile terminal use pattern will be described in more detail with reference to FIG. 5.

On the other hand, the controller 180 may select any one function to be executed based on a time point at which the predetermined touch input is sensed based on the formed mobile terminal use pattern during the step S202. In other words, the mobile terminal use pattern may include information on a frequency at which each function has been executed for each time, and the controller 180 may execute at least one function of the mobile terminal 100 operated by the user more than a predetermined number of times at a time point at which the predetermined touch input is sensed based on the predetermined touch input during the step S202. In this case, the executed functions may if) be executed in a background state. In case of functions executed in a background state, a low priority may be set to a function for which its execution screen is displayed on the display unit 151 (hereinafter, a function of displaying its execution screen on the display unit 151 will be referred to as a foreground function), and thus they will not affect on the execution of the foreground function.

On the other hand, when the at least one function is executed, the controller 180 may display at least one graphic object corresponding to the executed function(s), respectively, on the display unit 151 in response to the predetermined touch input (S204). In this case, the controller 180 may display the graphic object in various ways. For example, the graphic object may be displayed based on a predetermined region of the display unit 151 or one position of the display unit 151 to which the predetermined touch input is applied.

On the other hand, the graphic object may be various. For example, the controller 180 may display an icon corresponding to a function executed during the step S202 as the graphic object. Otherwise, the controller 180 may display the execution screen of the executed functions, respectively, in a reduced size as the graphic object. Otherwise, the controller 180 may display summary information (for example, text information or the like corresponding to the executed function) associated with the executed function as the graphic object.

Furthermore, graphic objects displayed during the step S204 may be displayed in a predetermined sequence or in a different manner according to the corresponding functions, respectively. For example, functions executed during the step S202 may be in a state that the display sequence is previously determined according to a predetermined condition. For an example, the sequence or the ranking of the functions, respectively, may be determined based on a predetermined condition such as a use frequency of each function or the like at a time point at which the predetermined touch input is sensed, and a sequence in which graphic objects corresponding to each function are displayed or a format in which each graphic object is displayed may be determined according to the sequence or ranking. In other words, a graphic object corresponding to a function with the highest user's use frequency may be displayed in the foremost manner or in the largest size over other graphic objects at a time point at which the predetermined touch input is applied, and on the contrary, a graphic object corresponding to a function with the lowest user's use frequency may be displayed in the hindmost manner or in the smallest size over other graphic objects.

On the other hand, when graphic objects are displayed during the step S204, the controller 180 may allow a user to select any one of the displayed graphic object. For example, the controller 180 may select any one graphic object based on an additional touch input to a specific graphic object, the direction of trajectory of a drag input applied thereto subsequent to a "predetermined touch input" sensed during the step S200, a position at which the drag input is ended, or the like. Otherwise, when the user does not select any one graphic object, it is of course to automatically select any one graphic object according to a predetermined sequence.

On the other hand, when any one graphic object is selected as described above, the controller 180 may display the execution screen of a function corresponding to the selected graphic object among functions executed during the step S202 on the display unit 151 (S206). In this case, a function corresponding to the selected graphic object may be executed in a foreground state, and accordingly, the execution screen thereof may be displayed on the display unit 151. Furthermore, in case of a function executed in a foreground state, contrary to a case of being executed in a background state, it may be controlled according to the user's manipulation, thereby performing the resultant operation.

Accordingly, the present disclosure may execute a function primarily used by a user in advance at a time point at which the user enters a touch input, and immediately display the execution screen of the relevant function on the display unit 151 according to the user's selection. Accordingly, the present disclosure may recommend functions primarily used by a user at a time point at which a predetermined touch input is applied, and immediately display any one execution screen of the recommended functions on the display unit 151, thereby allowing the user to more quickly select and use his desired function.

On the other hand, functions executed during the step S202 may be ended when a predetermined condition is satisfied. In other words, when a predetermined period of time has passed in a state that the execution screen of a specific function is displayed during the step S206, the controller 180 may end functions excluding a function for which the execution screen is currently displayed on the display unit 151 among functions executed during the step S202, namely, functions currently executed in a background state. Otherwise, when a predetermined period of time has passed in a state that any one function is not selected or when a predetermined end key is entered, the controller 180 may end the process of FIG. 2 in a state that the execution screen of any one of functions executed during the step S202 is not displayed on the display unit 151, and in this case, functions executed during the step S202 may be ended at the same time.

On the other hand, a method of automatically selecting a specific function in a state that graphic objects corresponding to functions executed during the step S202 are displayed has been described as an example in the foregoing description, but when a specific function is automatically selected, the execution screen of any one of functions executed during the step S202 may be of course immediately displayed on the display unit 151 while at the same time applying the predetermined touch input. In this case, for the executed functions, the execution screen of a function with the foremost or highest order or ranking set according to a condition set to each function may be displayed first of all on the display unit 151.

On the other hand, when the execution screen of any one of functions executed during the step S202 according to a predetermined order or ranking is displayed on the display unit 151 as described above, the controller 180 may of course display the execution screen of a function corresponding to the next order or ranking according to the user's selection. In other words, the user may apply a touch input for selecting a function corresponding to the next order or ranking, and in this case, the controller 180 may display the execution screen of a function corresponding to the next order or ranking of a function for which the execution screen is currently displayed on the display unit 151 (a function executed in a foreground state) on the display unit 151 based on the touch input.

Figure 3:
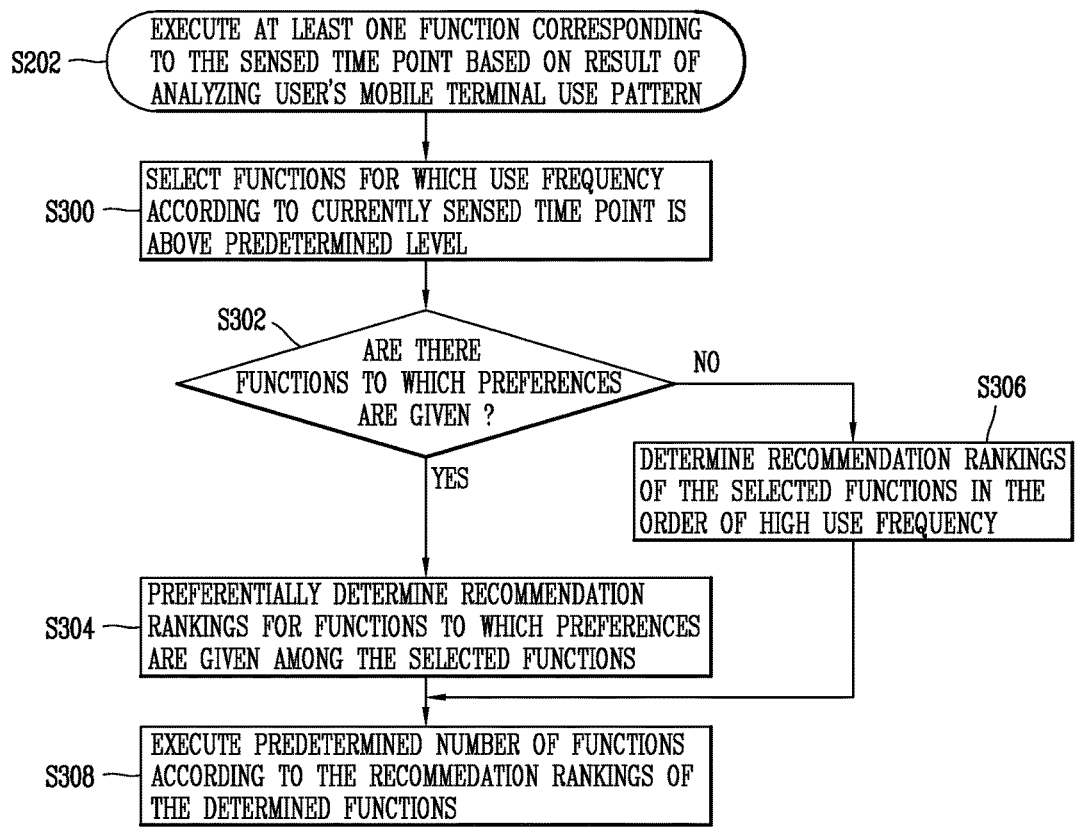
FIG. 3 is a flow chart illustrating a process of determining the at least one function according to a preference and use frequency set by a user on a mobile terminal associated with the present disclosure.

On the other hand, according to the foregoing description, it has been described that at least one "function" executed during the step S202 of FIG. 2 may be determined based on the user's preference set to a specific function. FIG. 3 is a flow chart illustrating a process of determining the at least one function according to a preference set by a user when there is any function with the user's preset preference among the functions of the mobile terminal 100 as described above.

Referring to FIG. 3, when a predetermined touch input is applied and a time point at which the predetermined touch input is applied is sensed during the step S200 of FIG. 2, the controller 180 of the mobile terminal 100 according to an embodiment of the present disclosure may select at least one function with a number of times, namely, use frequency, in which the function has been used at the relevant time, above a predetermined level based on a result of analyzing the user's mobile terminal use pattern (S300).

Furthermore, the controller 180 may check functions given with their preference among the selected functions (S302). For example, the functions given with the preference may be determined based on whether or not the user has manipulated the executed function.

For example, in case of a function of being merely executed and then neglected until the end thereof, the preference may be set to the lowest level. However, when there is any user's control associated with the relevant function (for example, a touch input applied to the display unit 151 or manipulation of keys provided therein in a state that a screen associated with the execution of the function is displayed on the display unit 151) subsequent to the execution, the preference for the relevant function may be set to a higher level. In this case, as the frequency of key inputs associated with the user's relevant function increases or a time interval of input keys decreases, the preference of the relevant function may be given to a higher level.

On the other hand, as a result of checking during the step S302, when there is a function given or set with the preference among the selected functions, the controller 180 may preferentially determine the recommendation ranking of the selected functions for functions given or set with the preference among the selected functions (S304). In other words, functions given or set with the preference may be set to a higher recommendation ranking over functions that are not given or set with the preference among the functions selected during the step S300, and as the given or set preference is higher, it may be set to a higher recommendation ranking. However, when there is no function given or set with the preference among the selected functions as a result of checking during the step S302, the controller 180 may determine a recommendation ranking based on an order with a higher number of times used at a time point at which the predetermined touch input is sensed, namely, an order with a higher use frequency among the selected functions (S306).

Here, the "recommendation ranking" may be provided to determine at least one function to be executed in response to a touch input sensed during the step S200 of FIG. 2 among functions selected during the step S300. In other words, the controller 180 may execute a predetermined number of functions during the step S202 of FIG. 2 based on their recommendation rankings among functions selected during step S300 according to the recommendation rankings determined during the step S304 or S306 (S308). Here, the predetermined number of times may be of course determined by the user.

On the other hand, the number of functions executed during the step S202 of FIG. 2 may be determined based on the user's mobile terminal use pattern. In other words, when the number of functions that have been used more than a predetermined number of times is less than the predetermined number at a time point at which the predetermined touch input is applied, it is of course to execute functions less than the predetermined number.

Figure 4:
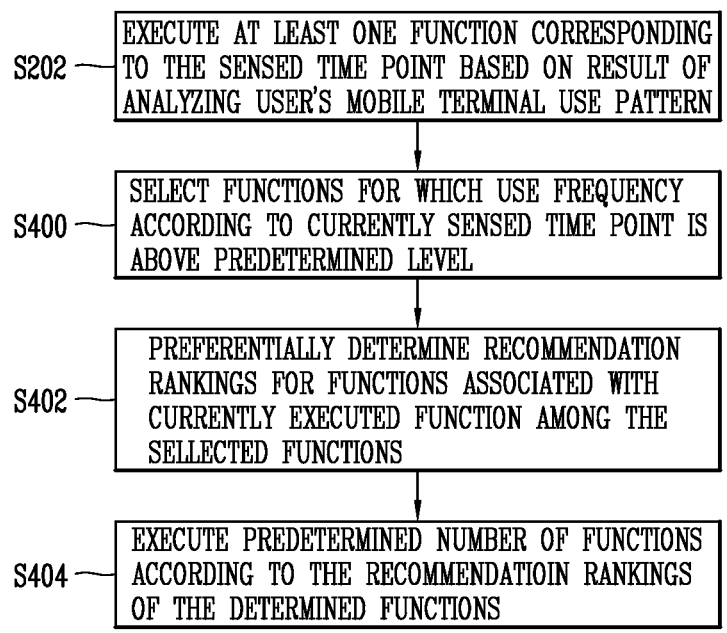
FIG. 4 is a flow chart illustrating a process of selecting functions associated with a function currently being executed at the time of user's touch input on a mobile terminal associated with the present disclosure.

According to the foregoing description, it has been described that at least one "function" executed during the step S202 of FIG. 2 may be determined based on a function for which the execution screen is displayed on the display unit 151. FIG. 4 is a flow chart illustrating a process of determining the at least one "function" according to a function for which the execution screen is displayed on the display unit 151 as described above.

Referring to FIG. 4, when a predetermined touch input and a time point at which the predetermined touch input is applied are sensed during the step S200 of FIG. 2, the controller 180 of the mobile terminal 100 according to an embodiment of the present disclosure may select at least one function for which a number of times at which the function is used at the relevant time, namely, use frequency, is above a predetermined level based on a result of analyzing the user's mobile terminal use pattern (S400).

On the other hand, functions selected during the step S400 may include "associated function(s)" with a function (foreground function) for which the execution screen is currently displayed on the display unit 151 of the mobile terminal 100.

Here, the "associated function" may be determined in various ways. For example, the "associated function" may be a function that is the same or similar to a function currently being executed in a foreground state. In other words, for example, when a function currently being in a foreground state is an Internet access function, a function associated with this may be functions of accessing the Internet through a portal site different from a currently accessed portal site. Otherwise, when the function currently being executed in a foreground state is a function of preparing a short messaging service (SMS) message, the "associated function" may be a function of preparing an SNS message, a multimedia messaging service (MMS) message or an E-mail.

On the other hand, according to the foregoing description, it has been described that a "function" executed during the step S202 of FIG. 2 may be any one of services provided through a specific "function" of the mobile terminal 100. In other words, the "function" may denote not only a function of accessing the Internet but also a service of accessing a specific webpage. Otherwise, the "function" may denote not only an SNS function but also a service of providing chatting with a specific group or specific figure in the SNS (hereinafter, referred to as a specific SNS community).

Accordingly, the "associated function" may denote a service provided through a function currently being executed in a foreground state. In other words, when the predetermined touch input in FIG. 2 is sensed, for example, when an Internet access function is currently being executed in a foreground state, the controller 180 may select at least one function including a service of accessing webpages that have primarily accessed by the user at a time point at which the touch input is sensed. Otherwise, for example, when an SNS function is currently being executed in a foreground state, the controller 180 may select at least one function including a service of accessing a specific SNS community that has been primarily used for conversations at a time point at which the touch input is sensed.

On the other hand, when at least one function is selected as described above, the controller 180 may determine the recommendation rankings of the selected functions (S402). Here, the recommendation ranking may be a ranking for determining at least one function to be executed in response to a touch input sensed during the step S200 of FIG. 2 among functions selected during the step S400 as described above.

On the other hand, during the step S402, the controller 180 may preferentially determine a recommendation ranking for the "associated function" over the non-associated functions. Furthermore, the controller 180 may of course determine a recommendation ranking in a different manner for each of the "associated functions" according to a result of analyzing the user's mobile terminal use pattern. In other words, in case of a function for which the user has used more frequently among the "associated functions," it may be determined to have a higher recommendation ranking over other functions.

Furthermore, the controller 180 may execute a predetermined number of functions during the step S202 of FIG. 2 based on a higher recommendation ranking according to the determined recommendation ranking (S404). For example, the controller 180 may perform an access to a specific webpage or specific SNS community with a function executed during the step S404. In other words, the controller 180 may access a plurality of different webpages or different SNS communities in response to a predetermined touch input sensed during the step S200 of FIG. 2. Furthermore, an access to such a webpage or SNS community may be executed in a background state on the mobile terminal 100.

On the other hand, a recommendation ranking determined during the steps of S304 and S306 of FIG. 3, and the step S204 of FIG. 2 may be a condition for determining the sequence or format of graphic objects displayed during the step S204 of FIG. 2. In other words, a graphic object corresponding to a function with the highest recommendation ranking among the executed functions may be displayed in the foremost manner or in the largest size over other graphic objects. On the contrary, a graphic object corresponding to a function with the lowest recommendation ranking among the executed functions may be displayed in the hindmost manner or in the smallest size over other graphic objects.

Figure 5:
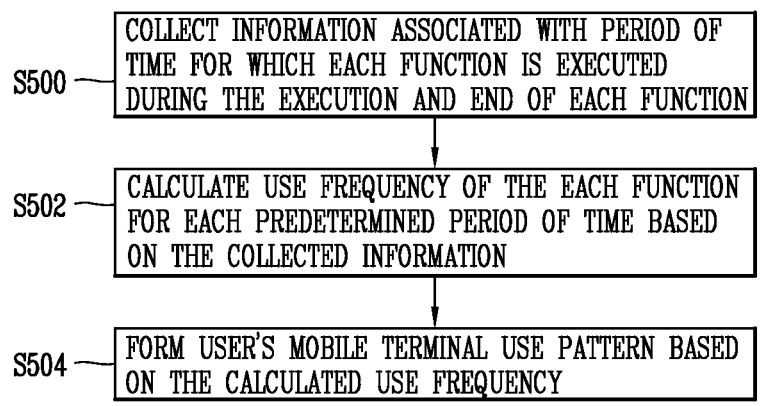
FIG. 5 is a flow chart illustrating a process of forming a user's mobile terminal use pattern on a mobile terminal associated with the present disclosure.

On the other hand, FIG. 5 is a flow chart illustrating a process of forming a user's mobile terminal use pattern on a mobile terminal associated with the present disclosure.

Referring to FIG. 5, the controller 180 of the mobile terminal 100 according to an embodiment of the present disclosure may collect information associated with a time at which the functions are executed at the time of the execution and end of each function of the mobile terminal 100 (S500). In other words, when a specific function is executed on the mobile terminal 100, the controller 180 may collect information associated with a time at which the function is executed. Furthermore, when the executed function is ended, the controller 180 may collect information on a time point at which the function is ended and a time at which the function is executed, namely, log information.

On the other hand, when the log information of functions executed on the mobile terminal 100 is collected while a user uses the mobile terminal 100 as described above, the controller 180 may calculate the use frequency of each function for each predetermined time based on the collected log information (S502). In other words, during the step S502, the controller 180 may check functions executed for each predetermined time based on the executed time. Furthermore, when the collection of such log information lasts for more than a predetermined period of time, the controller 180 may calculate a frequency at which each function has been executed for each predetermined time, namely, use frequency, based on daily collected log information.

On the other hand, the predetermined time may be determined in various ways. For example, the predetermined time may be set to any one of each second, each minute and each hour, and set to the unit of several seconds, several minutes or several hours. The interval of the predetermined time may be of course changed in any way according to the user's selection.

On the other hand, when the use frequency calculated during the step S502 is calculated, the controller 180 may form the user's mobile terminal use pattern based on the calculated use frequency (S504). The mobile terminal use pattern may include information on a frequency at which each function of the mobile terminal 100 is used according to the predetermined time interval based on 24 hours a day. Accordingly, when a predetermined touch input is applied during the step S200 of FIG. 2, the controller 180 of the mobile terminal 100 according to an embodiment of the present disclosure may extract information on a function of the mobile terminal 100 executed at a time point at which the touch input is applied and a frequency at which the function has been executed for a predetermined period of time, namely, use frequency. Furthermore, the extracted information may be used during the step S200 of FIG. 2 to determine functions executed in response to a touch input sensed during the step S200 of FIG. 2.

On the other hand, in the above description, an operation process of recommending at least one user's frequently used function for the user in response to a touch input when the predetermined touch input is applied on the mobile terminal 100 according to an embodiment of the present disclosure and displaying any one execution screen according to the user's selection among the recommended functions on the display unit 151 has been described in detail.

In the following description, examples in which at least one function executed according to a user's touch input and any one execution screen according to the user's selection are displayed on the mobile terminal associated with the present disclosure will be described in more detail with reference to the exemplary drawings.

Figure 6:
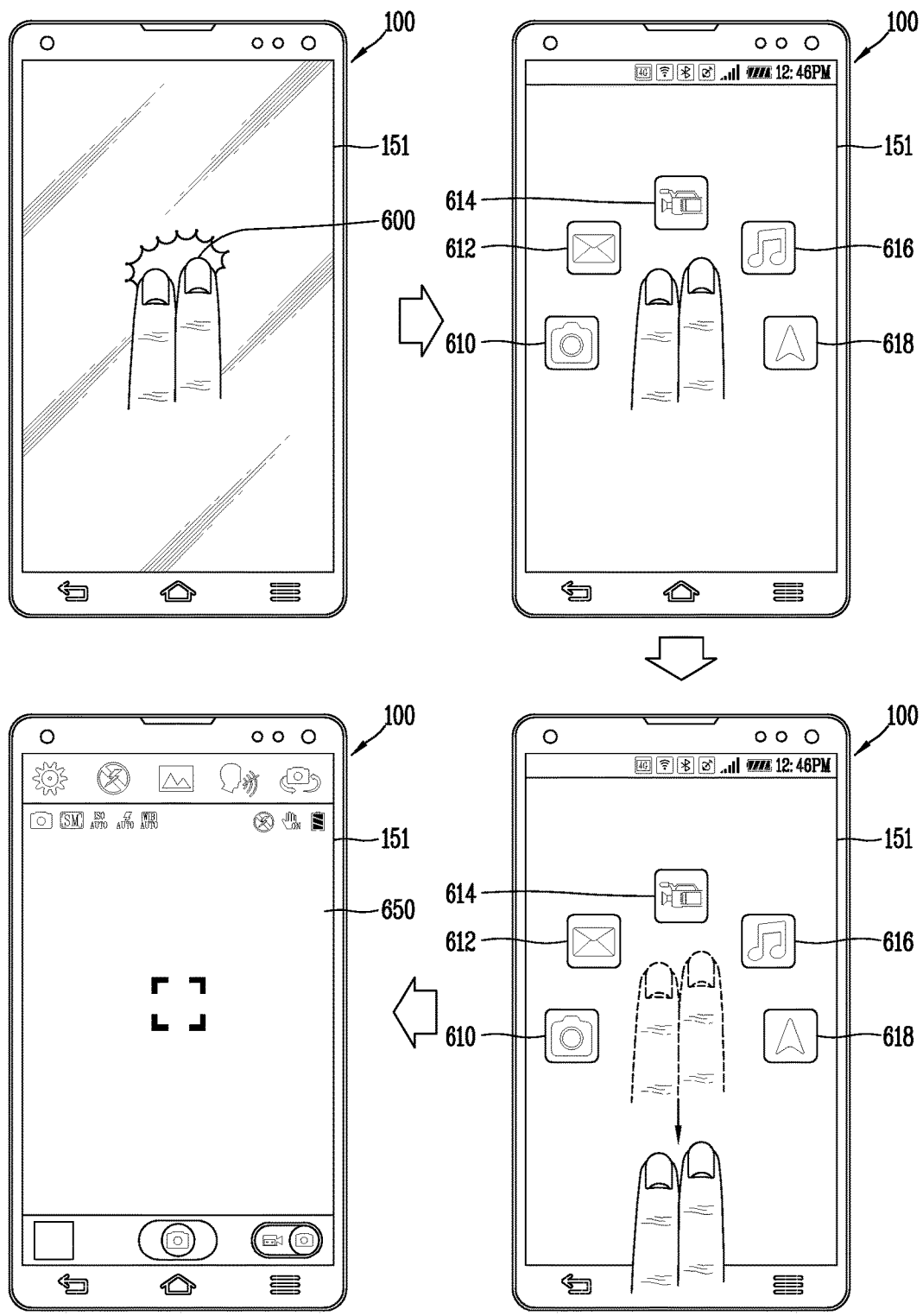
FIGS. 6 through 9 are exemplary views illustrating examples in which at least one function executed according to a user's touch input and any one execution screen according to the user's selection are displayed on the mobile terminal associated with the present disclosure.

First, FIG. 6 illustrates an example in which when a predetermined touch input is sensed on the mobile terminal 100 according to an embodiment of the present disclosure, at least one function is recommended and an example in which any one execution screen of them is displayed thereon.

Referring to FIG. 6, first, as illustrated in the first drawing of FIG. 6, when a user applied a predetermined touch input 600, the controller 180 may sense a time point at which the touch input 600 is applied. Furthermore, the controller 180 may execute at least one of functions of the mobile terminal 100 in a background state according to a time point (for example, PM 12:46) at which the touch input 600 is applied based on a result of analyzing a prestored user's mobile terminal use pattern. Here, the executed functions may be functions selected by a predetermined number based on a higher use frequency order or functions selected according to a predetermined preference or a function currently being executed in a foreground state. Hereinafter, functions executed based on a result of analyzing a time point at which the touch input 600 is applied and a prestored user's mobile terminal use pattern as described above will be referred to as a "recommended function."

On the other hand, when functions are executed as described above, the controller 180 may display graphic objects corresponding to functions currently being executed in a background state, namely, recommended functions, respectively, on the display unit 151 as illustrated in the second drawing of FIG. 6. Furthermore, when the recommended functions are a camera function, a message function, a video function, a music playback function and a navigation function, the controller 180 may display a first graphic object 610 corresponding to the camera function, a second graphic object 612 corresponding to the message function, a third graphic object 614 corresponding to the video function, a fourth graphic object 616 corresponding to the music playback function, and a fifth graphic object 618 corresponding to the navigation function, respectively, on the display unit 151.

On the other hand, it has been described that the graphic objects 610, 612, 614, 616, 618 are icons of the corresponding recommended functions, respectively, as an example in the second drawing of FIG. 6, but the graphic objects may be of course displayed in any other shapes. In other words, the graphic objects may include an execution screen of functions, respectively, executed in a background state or may include information corresponding to a predetermined order or ranking (for example, recommended ranking set to each function) set to the functions, respectively, executed in a background state.

In this state, the controller 180 may display the execution screen of any one of the recommended functions based on the user's selection on the display unit 151. In other words, the controller 180 may switch the screen of the display unit 151 to the execution screen of any one of the recommended functions. Here, when a predetermined user's touch input is applied to any one of the recommended functions, the controller 180 may display the execution screen of the any one according to a predetermined order or ranking on the display unit 151. In other words, as illustrated in the third drawing of FIG. 6, when a drag input 630 that does not select any one graphic object is applied subsequent to the user's touch input 600, the controller 180 may display the execution screen of a recommended function with the foremost or highest predetermined order or ranking (for example, recommended order) among the recommended functions currently being executed in a background state on the display unit 151.

Accordingly, as illustrated in the second drawing of FIG. 6, when the recommended functions are a camera function, a message function, a video function, a music playback function and a navigation function, and the order or ranking set to each recommended function is in the order of the camera function, the message function, the video function, the music playback function and the navigation function, the controller 180 may display the execution screen of the camera function on the display unit 151 in response to the drag input 630 as illustrated in the fourth drawing of FIG. 6. It is because the camera function has the foremost or highest order or ranking among functions being executed in the background state.

On the other hand, an example in which the execution screen of any one of the recommended functions automatically selected based on a predetermined order or ranking is displayed on the display unit 151 has been described in the foregoing FIG. 6, but the execution screen of any one of the recommended functions according to the user's selection may be of course displayed on the display unit 151.

Figure 7:
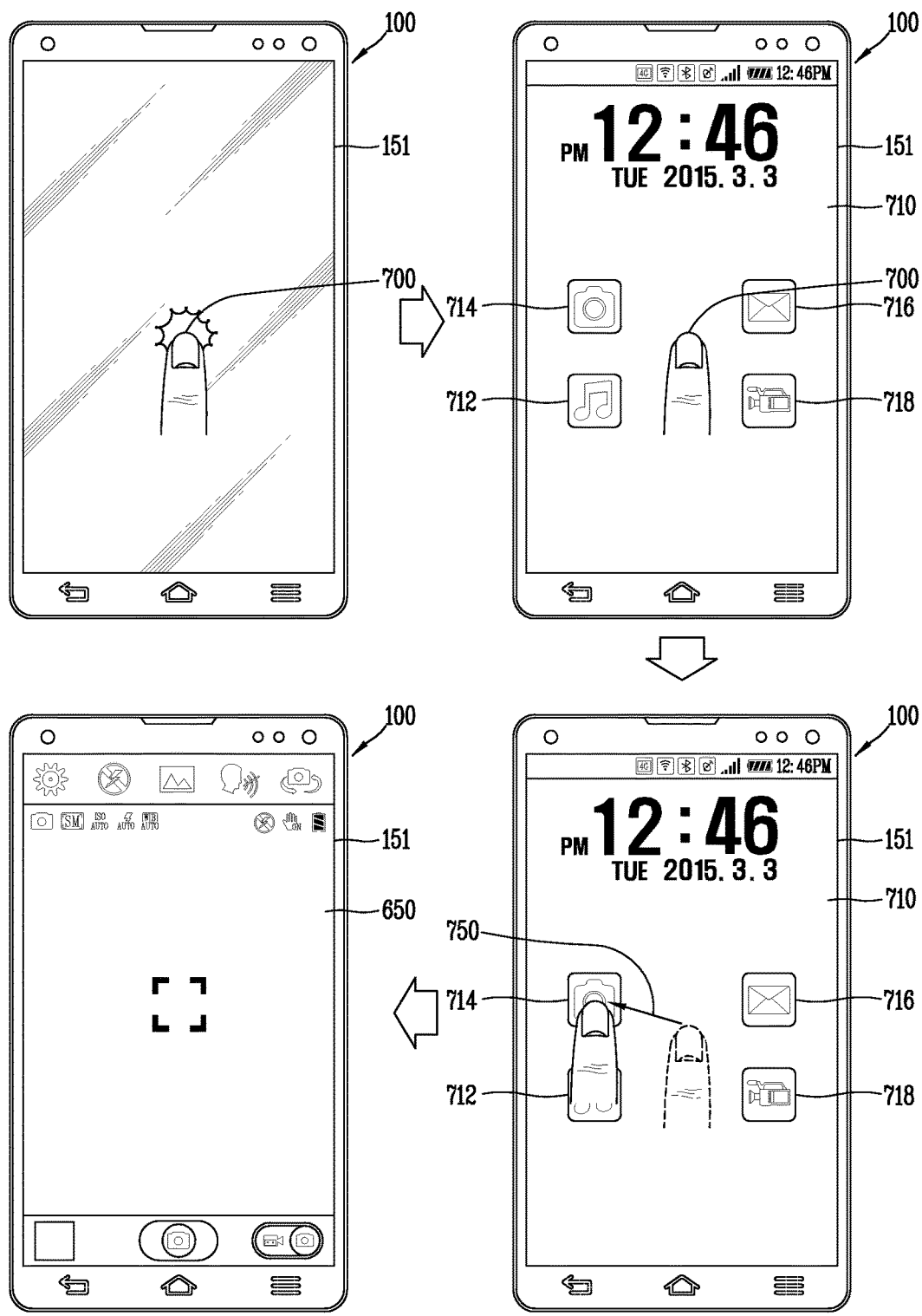

FIG. 7 illustrates an example of such a case.

Referring to FIG. 7, the first drawing of FIG. 7 illustrates an example in which a predetermined touch input is applied from a user. For example, as illustrated in the first drawing of FIG. 7, when a user makes a touch on one position of the display unit 151, and maintains a touch input 700 for more than a predetermined period of time (i.e., the touch input 700 is held for more than a predetermined period of time), the controller 180 may determines that a predetermined touch input has been applied. Furthermore, the controller 180 may sense a time point at which the touch input 700 is applied.

Then, the controller 180 may execute at least one of the functions of the mobile terminal 100 in a background state according to a time point (for example, PM 12:46) at which the touch input 700 is applied. Furthermore, when the functions executed in a background state, namely, "recommended functions," are a music playback function, a camera function, a message function and a video function, the controller 180 may display graphic objects 712, 714, 716, 718 corresponding to the recommended functions, respectively, on the display unit 151 as illustrated in the second drawing of FIG. 7.

In this state, the controller 180 may sense the user's selection for any one graphic object. In other words, for example, when a drag input 750 is applied subsequent to the touch input 700, the controller 180 may determine that the any one graphic object has been selected based on a length or direction of the trajectory of the applied drag input 750. In other words, as illustrated in the third drawing of FIG. 7, when a drag input 750 applied to one region of the display unit 151 displayed with a graphic object 714 corresponding to the camera function subsequent to a touch input 700 is sensed, the controller 180 may determine that the user has selected the graphic object 714. Then, the controller 180 may immediately display a recommended function corresponding to the selected graphic object 7174, namely, the execution screen of the camera function, on the display unit 151.

On the other hand, an example in which the graphic objects are displayed in the same shape has been illustrated in the foregoing FIGS. 6 and 7, but the graphic objects may be of course displayed in different manners or different orders according to an order or ranking (for example, recommended order) set to each of the corresponding recommended functions. In other words, as an order set to each of the corresponding recommended functions is ahead or higher, the controller 180 may display a graphic object in a larger size or display the graphic object at a position closer to a location at which the touch input is applied. Otherwise, when the graphic objects are displayed according to a predetermined direction, the controller 180 may display graphic objects for which an order set to each of the corresponding recommended functions is ahead or higher at a more front portion of the predetermined direction. Accordingly, the mobile terminal 100 according to an embodiment of the present disclosure may allow the user to check an order or ranking set to each of recommended functions through a configuration in which the graphic objects are displayed thereon.

On the other hand, the predetermined touch input may be an input to a specific key. In other words, when a predetermined type of input is applied to a specific key, the controller 180 may determined the input as a "predetermined touch input." Meanwhile, the key may be any one of soft keys displayed on the display unit 151. For an example of such a case, FIG. 8 illustrates a case where in a state that a menu, a home key and a back key are displayed as soft keys, the predetermined touch input is applied using the back key.

Figure 8:
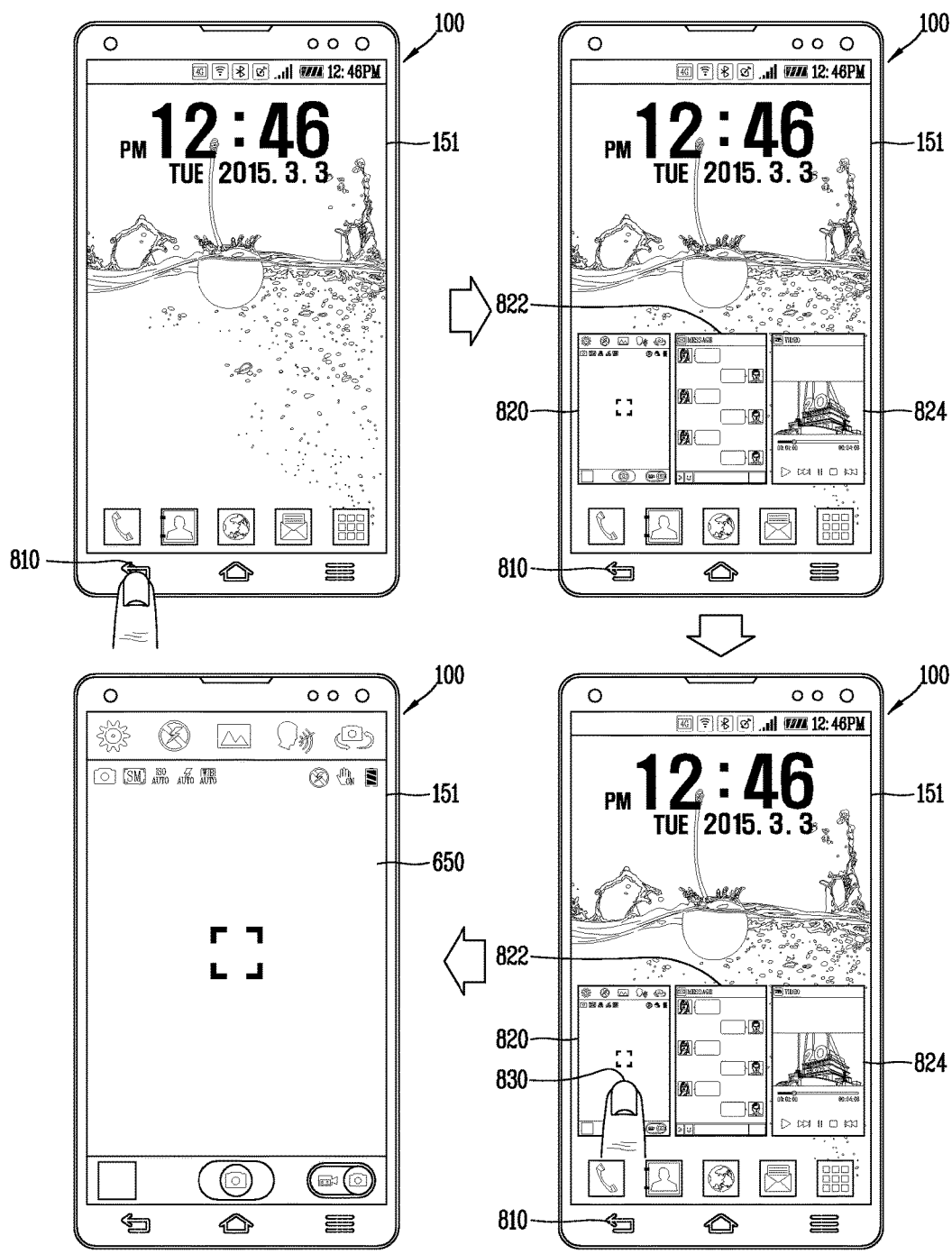

Referring to FIG. 8, first, the first drawing of FIG. 8 illustrates an example in which a menu key for displaying a predetermined menu list, a home key for displaying a predetermined home screen, and a back key for cancelling a currently entered command are displayed on the display unit 151 of the mobile terminal 100 according to an embodiment of the present disclosure. In this state, when the user applies a touch to the back key 810, the controller 180 may control the resultant function of the mobile terminal 100 (for example, cancellation of an entered input, etc.)

On the other hand, when a period of time for which the touch input is applied to a region of the display unit 151 displayed with the back key 810 is above a predetermined period of time, the controller 180 may determine the user's touch input to the back key 810 as a predetermined touch input for recommending at least one function. Furthermore, when the user's touch input to the back key 810 is determined as the predetermined touch input, the controller 180 may execute at least one function based on a time point at which the touch input is applied and a user's mobile terminal use pattern. Accordingly, the at least one function may be executed in a background state. Furthermore, functions executed in a background state, namely, graphic objects corresponding to recommended functions, respectively, may be displayed on the display unit 151.

In this case, graphic objects displayed on the display unit 151 may include an execution screen of the corresponding recommended functions, respectively. In other words, as illustrated in the second drawing of FIG. 8, the controller 180 may display graphic object 820, 822, 824 corresponding to the execution screen of each recommended function currently being executed in at least one region of the display unit 151. In this case, the controller 180 may display the graphic object 820, 822, 824 in the vicinity of one position of the display unit 151 or in a predetermined region of the display unit 151. Here, the graphic objects may be of course displayed as described above the back key 810.

In this state, the controller 180 may allow the user to select any one graphic object. In other words, as illustrated in the third drawing of FIG. 8, when a user's touch input 830 is applied to one position of the display unit 151 displayed with any one of graphic objects 820, 822, 824, the controller 180 may sense this, and recognize it as the selection of the any one graphic object 820. Then, the controller 180 may display a function corresponding to the selected graphic object 820, namely, an execution screen of a camera function, on the display unit 151. The fourth drawing of FIG. 8 illustrates an example in which a function (camera function) corresponding to the user's selected graphic object 820 as described above is displayed thereon.

On the other hand, an example in which when a predetermined touch input is applied, at least one function is executed and an execution screen of any one of them is displayed on the display unit 151 has been merely described in the foregoing description, but the present disclosure may be also applicable to a case where the mobile terminal 100 is in a locked state. In this case, the controller 180 may execute at least one function and display an execution screen of any one of them on the display unit 151 according to whether or not at least one touch input applied to release the locked state of the mobile terminal 100 corresponds to a predetermined touch input.

Here, the locked state may denote a state in which the execution of at least one of functions executable on the mobile terminal 100 is restricted. In this case, when a plurality of touch inputs forming a predetermined touch pattern are applied or when a drag input matching a predetermined trajectory is applied by a user, the controller 180 may release a locked state of the mobile terminal 100. Furthermore, when a user's touch input for entering any one of the plurality of touch inputs or a predetermined trajectory matches a predetermined touch input reference, the controller 180 may determine the user's touch input as executing the at least one function and displaying an execution screen of any one of them on the display unit 151.

Figure 9:
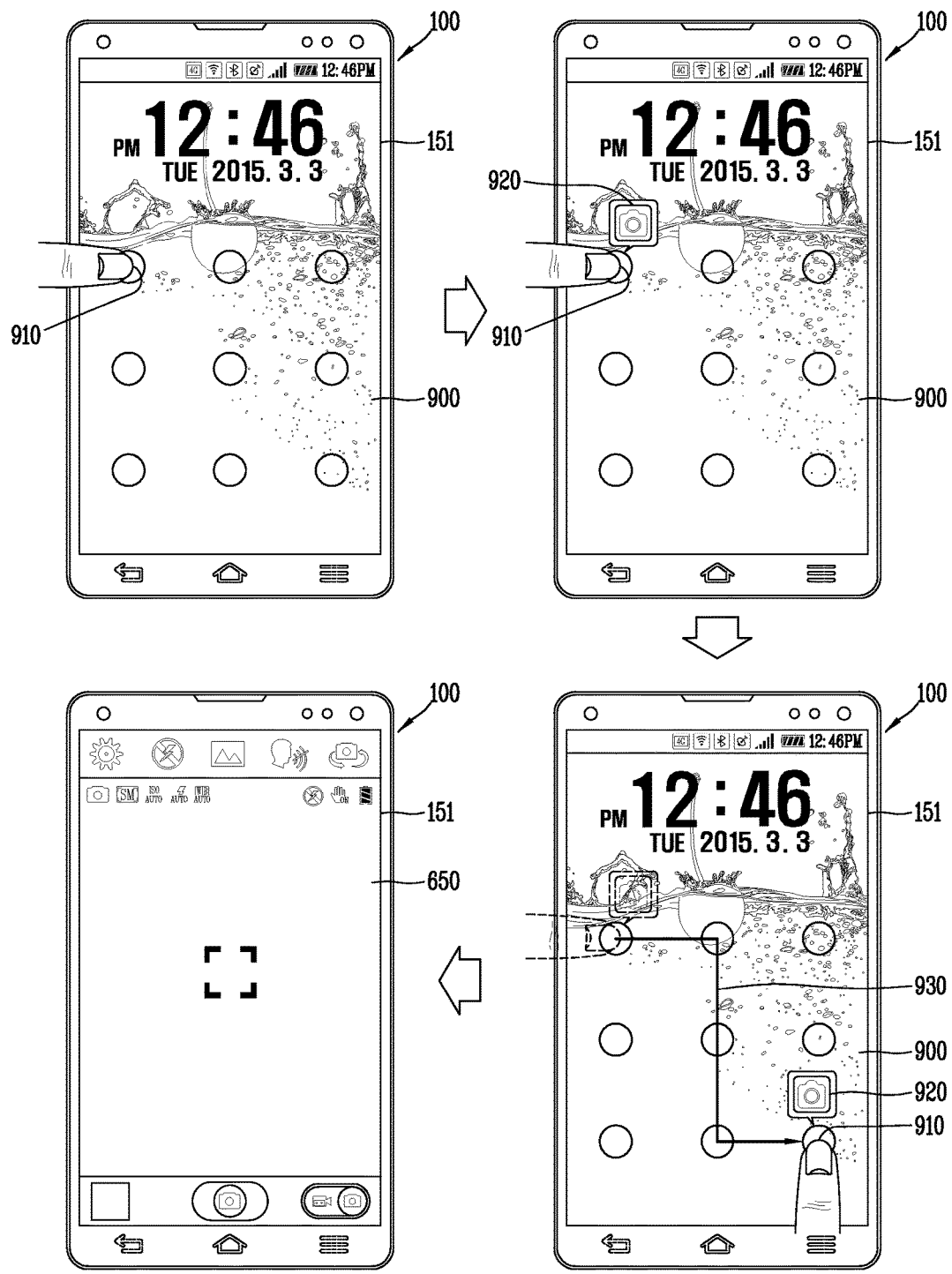

FIG. 9 illustrates an example of such a case.

Referring to FIG. 9, when the mobile terminal 100 is switched to a locked state the controller 180 of the mobile terminal 100 according to an embodiment of the present disclosure may display a screen (lock screen 900) capable of receiving a user's input for releasing the locked state on the display unit 151 as illustrated in the first drawing of FIG. 9. Then the controller 180 may sense a user's touch input 910 applied to the display unit 151 displayed with the lock screen 900 as an input for releasing the locked state of the mobile terminal 100.

On the other hand, the controller 180 may determine whether or not the touch input 910 is the "predetermined touch input" in FIG. 2 based on a state in which the user's touch input 910 is applied thereto. In other words, when the user's touch input 910 maintains a state in which the touch input is applied for more than a predetermined period of time (namely, maintains a hold state) or the touch input is applied at a pressure above a predetermined level, the controller 180 may determine it as the "predetermined touch input" in FIG. 2. Then, the controller 180 may execute at least one function based on a time point at which the sensed "predetermined touch input" is applied and the user's mobile terminal use pattern as described in the step S202 of FIG. 2. Here, the at least one function may be executed in a background state.

On the other hand, the controller 180 may display a graphic object 920 corresponding to at least one of the functions executed in a background state, namely, recommended functions, adjacent to one position of the display unit 151 to which the touch input 910 determined as the "predetermined touch input" is applied. Here, the controller 180 may display a graphic object corresponding to a predetermined recommended function with the foremost or highest order or ranking among the recommended functions, namely, a recommended function for which a recommendation ranking set to each recommended function is the highest, adjacent to one position of the display unit 151 at which the graphic image 910 is sensed.

Here, when functions executed based on a time point at which the "predetermined touch input" is sensed and the user's mobile terminal use pattern are a camera function, a message function, a video function, a music playback function and a navigation function as illustrated in FIG. 6, the controller 180 may display a graphic object 920 corresponding to a function with the highest recommendation ranking, namely, the camera function, on the display unit 151. The second drawing of FIG. 9 illustrates such an example.

On the other hand, as illustrated in the second drawing of FIG. 9, when a user applies a drag input extended to the touch input 910 in a state that a graphic object 920 corresponding to a specific recommended function is displayed adjacent to a position to which the user's touch input 910 is applied, the graphic object may move along a drag input trajectory applied by the user's touch input 910 while the drag input is applied. In other words, as illustrated in the third drawing of FIG. 9, when a user's finger moves while drawing a predetermined trajectory 930 in a state that the user's finger applies a touch input 910, the controller 180 may display a graphic object 920 moving along the drag input trajectory 930 on the display unit 151.

On the other hand, as illustrated in the third drawing of FIG. 9, when a drag input trajectory 930 is applied to a lock screen 900, the controller 180 may compare the applied drag input trajectory 930 with a predetermined drag input trajectory. Then, when the applied drag input trajectory matches a predetermined drag input trajectory as a result of matching, the controller 180 may release the locked state of the mobile terminal 100.

On the other hand, when the locked state of the mobile terminal 100 is released as described above, the controller 180 may display an execution screen of a recommended function corresponding to the graphic object 920 on the display unit 151. In other words, when the graphic object 920 displayed while applying the drag input trajectory 930 is a graphic object corresponding to the camera function as illustrated in the third drawing of FIG. 9, the controller 180 may display an execution screen of the camera function among recommended functions currently being executed in a background state on the display unit 151 as illustrated in the fourth drawing of FIG. 9.

However, when the applied drag input trajectory does not match a predetermined drag input trajectory as a result of the matching, the controller 180 may not release the locked state of the mobile terminal 100. In this case, the controller 180 may of course end the recommended functions executed when the touch input 910 is applied.

On the other hand, a case where the lock release state is released by a lock release pattern corresponding to a predetermined drag input trajectory has been described as an example in the foregoing description, but it is merely an example for describing the present disclosure and the present disclosure may not be necessarily limited to this. In other words, the present disclosure may be of course applicable to a case where the locked state is released by a touch pattern formed with touch inputs applied plural number of times as well as a drag input trajectory.

In other words, when any one of a plurality of touch inputs applied to form the touch pattern maintains a state in which a touch input is applied for more than a predetermined period of time (for example, in case of being held), the controller 180 may determine it as a touch input for executing recommended functions and displaying an execution screen of any one of recommended functions. Furthermore, in this case, when a user's next touch input for entering the remaining of the predetermined touch pattern is applied, the controller 180 may display a graphic object 920 corresponding to any one of the executed recommended functions on the display unit 151. Furthermore, when the locked state of the mobile terminal 100 is released, the execution screen of a function corresponding to the graphic object 920 may be immediately displayed on the display unit 151.

On the other hand, a case where at least one function is executed as a recommended function based on a state in which the touch input for lock release is applied, and a graphic object corresponding to a function with the foremost predetermined order or the highest ranking among them is displayed on the display unit 151 has been described in the foregoing description of FIG. 9, but the graphic object may be of course changed in any way according to the user's selection. In other words, the controller 180 may change graphic objects corresponding to the recommended functions, respectively, based on a predetermined order according to a time for which the touch input 910 has been held. Here, an order for changing the graphic object may be dependent on a predetermined order or ranking set to the recommended functions, respectively.

Accordingly, the user may apply the drag input trajectory 930 when a graphic object corresponding to a desired function among the changed graphic object is displayed. Therefore, according to the present disclosure, when releasing a locked state, the execution screen of a user's desired specific function among the executed at least one recommended functions may be of course immediately displayed on the display unit 151.

On the other hand, in the foregoing description, an example in which at least one function is recommended and executed according to a time point at which a user's input is applied and the user's mobile terminal use pattern, and the execution screen of any one of them is displayed on the display unit 151 has been described in detail with reference to exemplary views.

On the other hand, as described above, the controller 180 of the mobile terminal 100 according to an embodiment of the present disclosure may display an execution screen of any one of the executed recommended functions on the display unit 151. Furthermore, the controller 180 may display an execution screen of a different recommended function on the display unit 151 based on various user's inputs in a state that the any one recommended function is executed. For example, such a user's input may be a user's touch input or drag input to a predetermined region of the display unit 151 or a touch input corresponding to a predetermined touch gesture.

FIGS. 10 through 14 illustrate examples in which an execution screen displayed on the display unit 151 is changed to an execution screen of a different recommended function according to a user's input in a state that that an execution screen of any one of the recommended functions is displayed on the display unit 151. For the sake of convenience of explanation, FIGS. 10 through 14 are described on the assumption that in a state that that the execution screen 650 of a camera function is displayed among recommended functions executed according to a user's touch input, it is changed to an execution screen of another recommended function.

Figure 10:
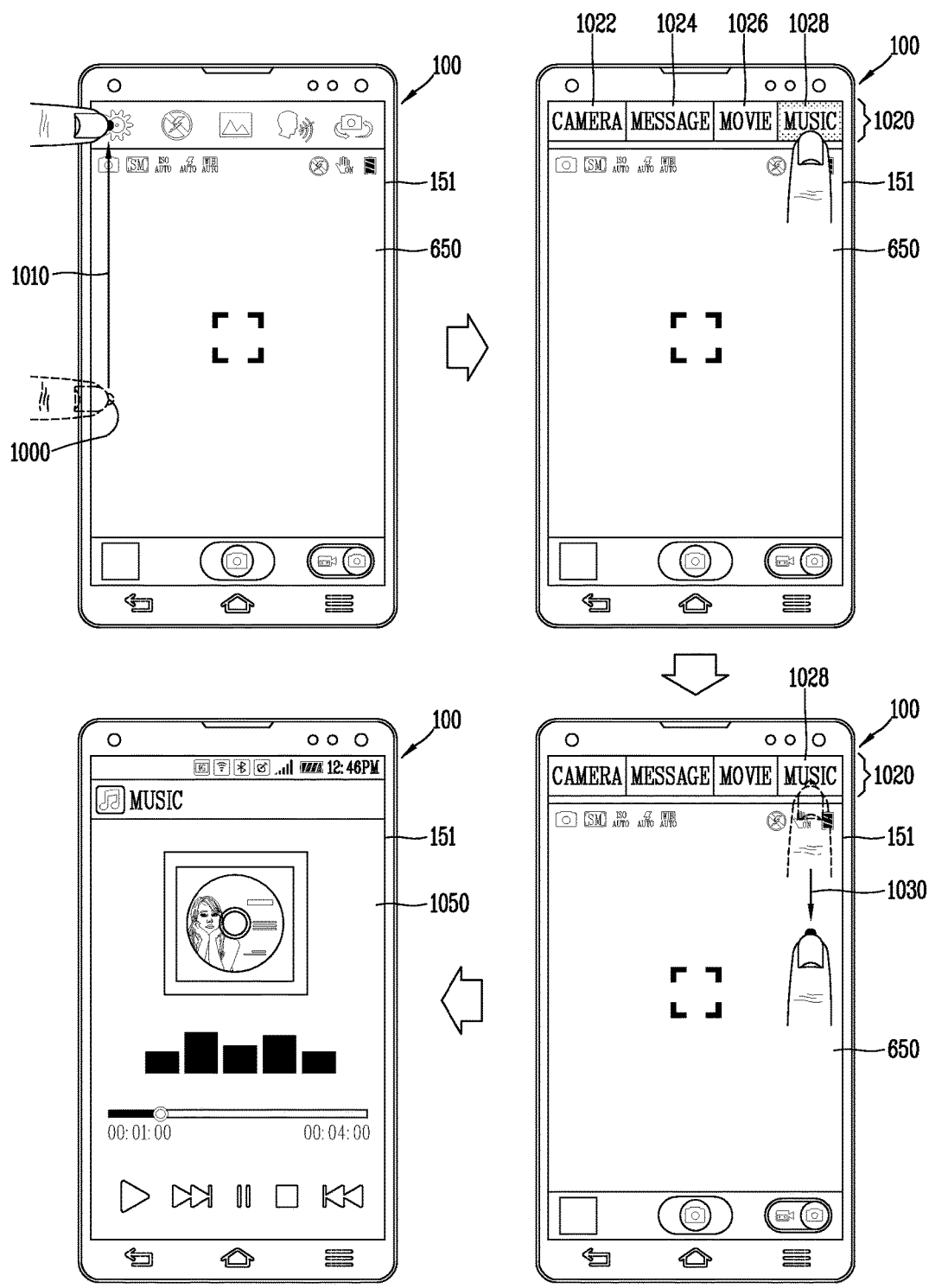
FIGS. 10 through 14 are exemplary views illustrating examples in which an execution screen of a function different from a function currently being displayed on the display unit among previously executed functions is displayed according to a user's touch input on the mobile terminal associated with the present disclosure.

First, referring to FIG. 10, FIG. 10 illustrates an example in which an execution screen displayed on the display unit 151 is changed based on a touch input or drag input applied to a specific position of the mobile terminal 100.

For example, the specific position of the mobile terminal 100 may be a position corresponding to a bezel portion of the mobile terminal 100 or an edge of the display unit 151. In other words, as illustrated in the first drawing of FIG. 10, when a drag input having a trajectory above a predetermined length is applied along a bezel of the mobile terminal 100 or any one of the edges of the display unit 151, the controller 180 may recognize it as a user's input for changing an execution screen displayed on the display unit 151. In this case, the controller 180 may execute any one recommended function based on a time point at which a user's input for a change of the execution screen is applied and the user's mobile terminal use pattern.

In this case, when there is a function that has been executed as a recommended function, namely, executed in a background state, among at least one recommended function, the controller 180 may of course maintain the function of being executed as it is based on a time point at which a user's input for a change of the execution screen is applied and the user's mobile terminal use pattern. On the contrary, when there is a function that is not included in recommended functions based on a time point at which a user's input for a change of the execution screen is applied and the user's mobile terminal use pattern among functions that have been executed as recommended functions, the function may be of course ended.

Furthermore, as illustrated in the second drawing of FIG. 10, information 1022, 1024, 1026, 1028 corresponding to the recommended functions may be displayed in a predetermined one region 1020 of the display unit 151.

On the other hand, the information 1022, 1024, 1026, 1028 corresponding to the recommended functions may be displayed in various formats. For example, as illustrated in the second drawing of FIG. 10, they may be displayed in a text format or displayed in a graphic object format such as an icon. In addition, though not shown in the drawing, the recommended functions may include information on a predetermined order or ranking. Of course, an order in which the recommended functions are displayed in the predetermined region may be also determined according to the predetermined order or ranking.

On the other hand, when the information 1022, 1024, 1026, 1028 corresponding to the recommended functions are displayed in a predetermined one region 1020 as described above, the controller 180 may determine whether or not any one recommended function is selected based on a user's touch input to the predetermined one region. In other words, as illustrated in the second or third drawing of FIG. 10, when a user selects information 1028 corresponding to any one recommended function with his or her touch input (second drawing of FIG. 10) or a drag input trajectory 1030 above a predetermined length is applied from one position of the predetermined region displayed with the information 1028 corresponding to the any one recommended function, the controller 180 may determine that a recommended function corresponding to the information 1028 has been selected by the user. Accordingly, the controller 180 may display a screen on which a recommended function, namely, music playback function, corresponding to the information 1028 is executed on the display unit 151 as illustrated in the fourth drawing of FIG. 10.

On the other hand, a case where information on recommended functions are displayed in a predetermined one region of the display unit 151 in the description of FIG. 10, but the one region may be of course formed based on one position of the display unit 151 at which the drag input has been ended. In this case, the controller 180 may form a region 1020 displayed with information on the recommended functions to extend a drag input from the one position of the display unit 151 at which the drag input has been ended, and display an execution screen corresponding to any one recommended function according to a length of the applied drag input or one position of the display unit 151 at which the drag input has been ended on the display unit 151.

Figure 11A:
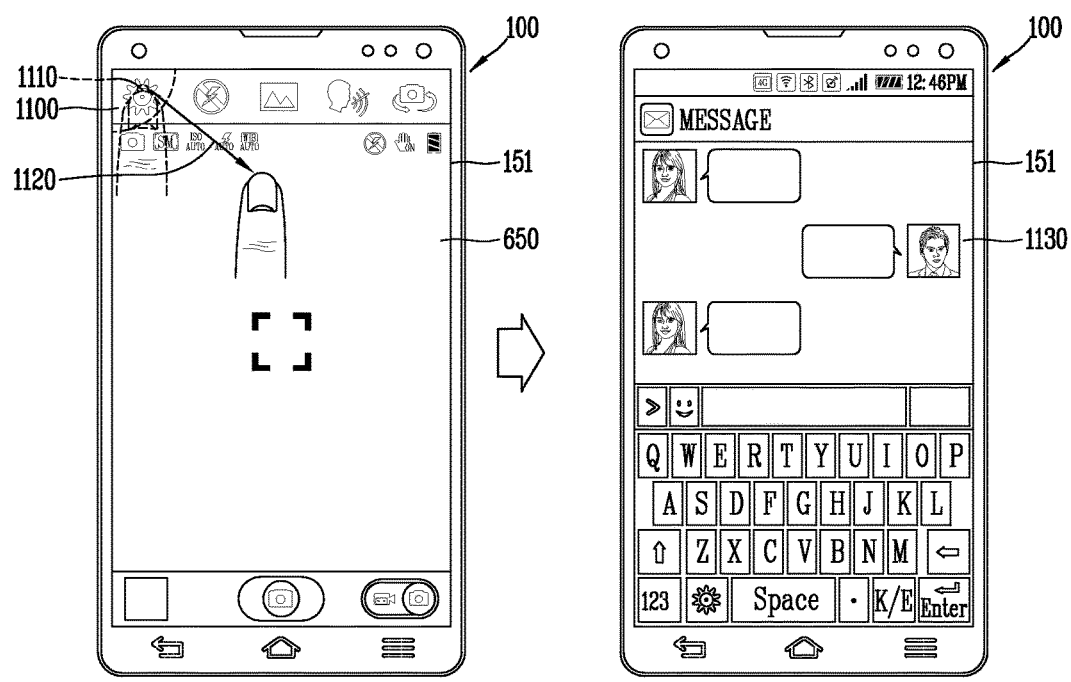
Figure 11B:
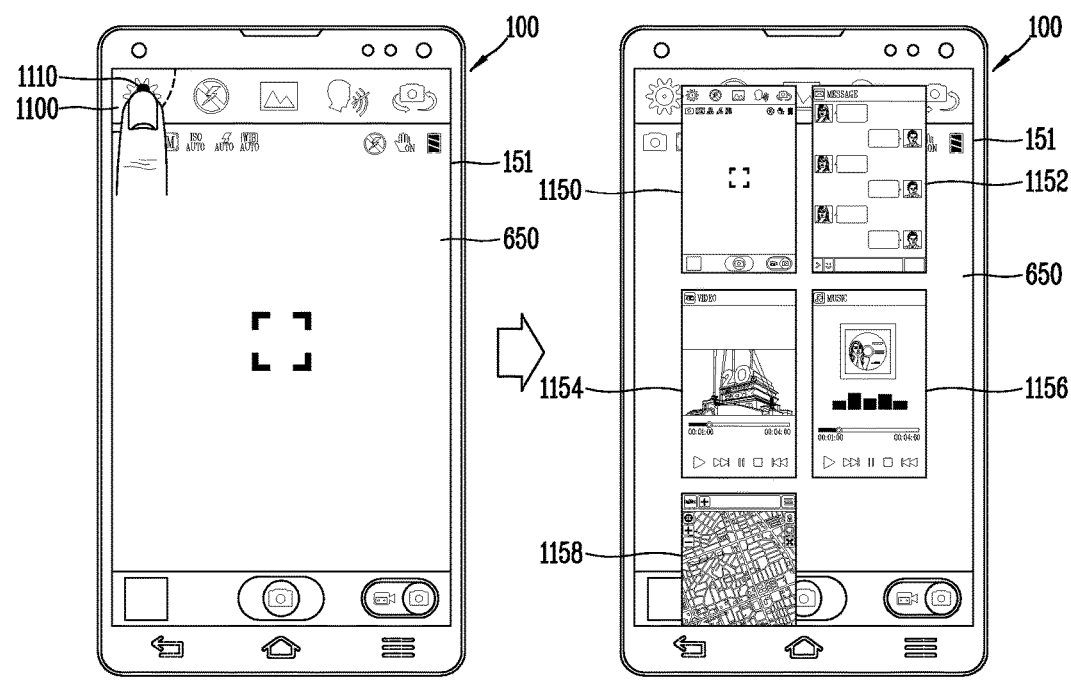

On the other hand, contrary to the illustration of FIG. 10, the controller 180 may change an execution screen displayed on the display unit 151 based on a touch input applied to the predetermined one region of the display unit 151. FIGS. 11A and 11B illustrate such an example.

First, referring to FIG. 11A, FIG. 11A illustrates an example in which an execution screen currently displayed on the display unit 151 is changed based on a touch input applied to one region of the display unit 151 or the resultant applied drag input.

In other words, the controller 180 of the mobile terminal 100 according to an embodiment of the present disclosure may sense a user's touch input 1110 to a predetermined one region 1100 in a state that an execution screen for any one recommended function is displayed on the display unit 151 as illustrated in the first drawing of FIG. 11A. Furthermore, when a drag input 1120 is applied subsequent to the touch input 1110, the controller 180 may determine it as a user's input for changing the execution screen currently displayed on the display unit 151.

In this case, the controller 180 may display an execution screen of a recommended function on the display unit 151 according to a next order or next ranking of the recommended function for which the execution screen is currently displayed on the display unit 151 based on the touch input 1100 and drag input 1110. Furthermore, as illustrated in FIG. 6 in the above, when recommended functions are a camera function, a message function, a video function, a music playback function and a navigation function, and an order or ranking set to each recommended function is in the order of the camera function, the message function, the video function, the music playback function and the navigation function, the controller 180 may change an execution screen displayed on the display unit 151 from the execution screen of the camera function to the execution screen of the message function. It is because a recommended function corresponding to a next order of the camera function is a message function. The second drawing of FIG. 11A illustrates such an example.

On the other hand, the recommended functions may of course correspond to the lengths of different drag input trajectories, respectively. Furthermore, the length of each drag input trajectory corresponding to the each recommended function may be determined according to an order or ranking set to each recommended function. In other words, in case of a recommended function with the highest recommendation ranking, the length of the corresponding drag input trajectory may be the shortest, and on the contrary, in case of a recommended function with the lowest recommendation ranking, the length of the corresponding drag input trajectory may be the longest. In this case, the controller 180 may display an execution screen corresponding to any one of the recommended functions on the display unit 151 according to the trajectory length of the drag input 1120.

On the other hand, contrary to the illustration in FIG. 11A, the controller 180 may of course change an execution screen currently displayed on the display unit 151 based on a user's touch input 1110 applied to the predetermined region 1100. In other words, when a user's touch input 1110 is applied to the predetermined 1100, the controller 180 may display an execution screen of a recommended function according to a next order or next ranking of the recommended function for which the execution screen is currently displayed on the display unit 151.

On the other hand, in this case, a period of time for which the touch input 1110 is applied may be of course differently set to the recommended functions, respectively. Furthermore, the length of each touch input application period of time corresponding to the each recommended function may be determined according to an order or ranking set to each recommended function. In other words, in case of a recommended function with the highest recommendation ranking, the length of the corresponding touch input application period of time may be the shortest, and on the contrary, in case of a recommended function with the lowest recommendation ranking, the length of the corresponding touch input application period of time may be the longest. In this case, the controller 180 may display an execution screen corresponding to any one of the recommended functions on the display unit 151 according to a period of time for which the touch input 1110 is applied.

On the other hand, the controller 180 may of course display information on an execution screen of currently executed recommended functions, respectively, on the display unit 151 based on a user's touch input 1110 applied to the predetermined region 1100. In other words, as illustrated in the second drawing of FIG. 11B, the controller 180 may display different execution screens 1150, 1152, 1154, 1156, 1158 corresponding to a plurality of recommended functions, respectively, on the display unit 151 based on a user's touch input 1110, and display an execution screen corresponding to any one function of them according to the user's selection on the display unit 151.

Figure 12:
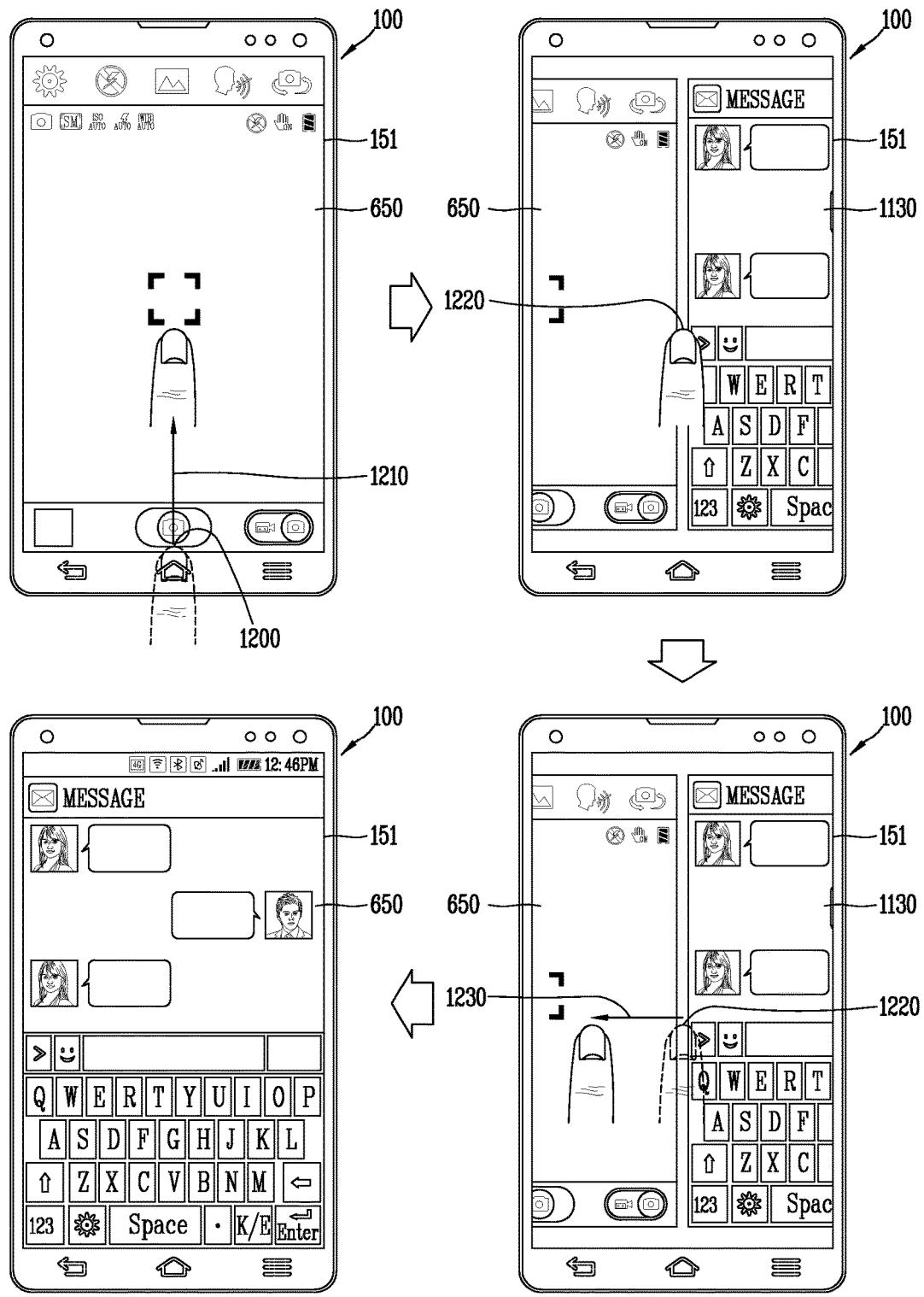
Figure 13:
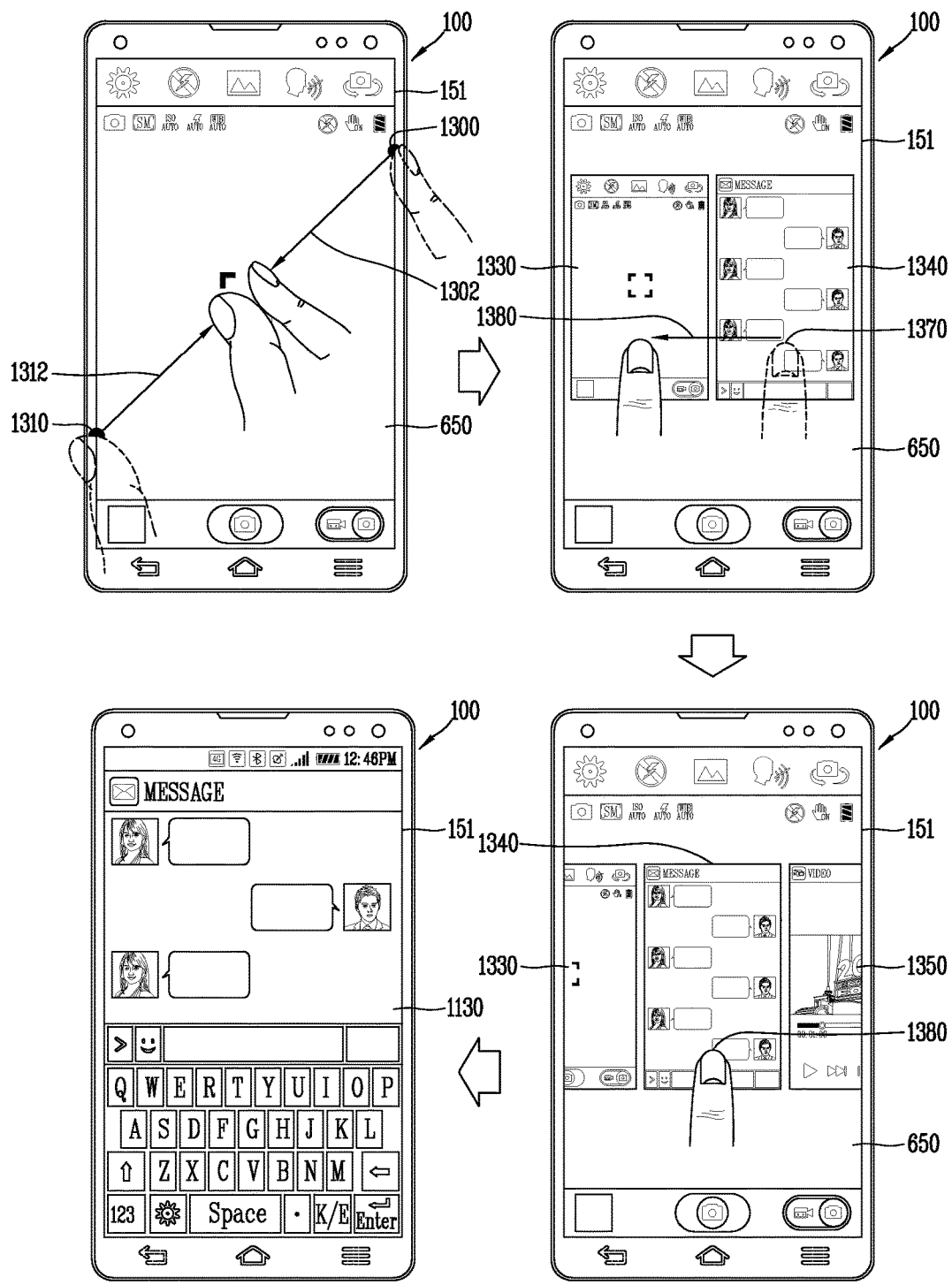

On the other hand, the controller 180 of the mobile terminal 100 according to an embodiment of the present disclosure may change a function in a foreground state, namely, a function for displaying an execution screen currently on the display unit 151, based on a touch input gesture such as a user's flick or swipe in a state that an execution screen for any one recommended function is displayed on the display unit 151. FIGS. 12 and 13 illustrate such an example.

First, referring to FIG. 12, the first drawing of FIG. 12 illustrates an example in which a predetermined user's input is applied in a state that an execution screen for any one recommended function is displayed on the display unit 151. For example, as illustrated in the first drawing of FIG. 12, when a drag input above a predetermined length is applied to one position 1200 of the display unit 151, the controller 180 may switch it to a state in which a change of the execution screen displayed on the display unit 151 is currently allowed.

In other words, the controller 180 may execute recommended functions according to the drag input 1210, namely, functions according to a time point at which the drag input 1210 is sensed and the user's mobile terminal use pattern according to the time point based on the drag input 1210, and arrange execution screens corresponding to the executed functions in a predetermined order. Furthermore, the controller 180 may display at least one of the arranged execution screens on the display unit 151 according to a swipe input applied subsequent to the drag input 1210.

The second drawing of FIG. 12 illustrates such an example. The second drawing of FIG. 12 illustrates an example in which part of the execution screen 650 of the camera function and part of the execution screen 1130 of the message function are displayed on the display unit 151. In other words, when changed to a "state in which a change of the execution screen displayed on the display unit 151 is allowed," the controller 180 may display part of the execution screen of a function (for example, camera function) currently being executed in a foreground state and part of the execution screen of another function (for example, message function) adjacently arranged according to a predetermined order according to a user's touch input, thereby indicating a state in which a change of the execution screen is currently allowed.

In this case, the controller 180 may change a function executed in a foreground state according to a user's swipe input. In other words, as illustrated in the third drawing of FIG. 12, when a user applies a swipe input 1230 applied in the left direction in a state that he or she applies a touch input 1220, the controller 180 may display the execution screen 1130 of another function (for example, message function) on the display unit 151 according to the swipe input 1230. In this case, as the length of the applied swipe input increases, the controller 180 may display a larger portion of the execution screen 1130 of the another function, thereby allowing the execution screen of each recommended function to actually move according to the swipe input 1230.

On the other hand, when the entire portion of the execution screen 1130 of the another function is displayed on the display unit 151 according to the swipe input, the controller 180 may determine a function to be executed in a foreground state according to the user's selection. In other words, when a predetermined period of time has passed in a state that the entire portion of the execution screen 1130 of the another function is displayed or a predetermined touch input, drag input or predetermined key is entered, the controller 180 may execute a function of currently displaying an execution screen in a foreground state. As a result, as illustrated in the fourth drawing of FIG. 12, the message function may be executed in a foreground state, and accordingly, a screen on which the message function is executed may be displayed on the display unit 151.

However, when a user applies a swipe input again subsequent to the swipe input 1230, the controller 180 may display the resultant execution screen corresponding to another function on the display unit 151. In this case, part of the execution screen 1130 of the message function and part of the execution screen of another function adjacent to the message function may be displayed on the display unit 151. Furthermore, any one function may be executed in a foreground state and the execution screen of the function may be displayed on the display unit 151 according to the user's selection.

On the other hand, FIG. 12 assumes a case where execution screens corresponding to the recommended functions are arranged in a transverse direction of the display unit 151 illustrated in FIG. 12. Accordingly, FIG. 12 describes a case where execution screens of different functions are displayed on the display unit 151 according to a user's swipe input. Furthermore, when a flick input is sensed from the user in this state, the controller 180 may sense the flick input as the user's input for selecting the execution screen of a specific function.

However, contrary to the foregoing description, execution screens corresponding to the recommended functions may be of course arranged in a longitudinal direction of the display unit 151 as illustrated in FIG. 12. In this case, the controller 180 may display the execution screens of different functions on the display unit 151 based on a flick input other than the swipe input. Furthermore, when a swipe input is sensed from the user in this state, the controller 180 may sense the swipe input as the user's input for selecting the execution screen of a specific function.

On the other hand, contrary to the illustration in FIG. 12, when a predetermined specific touch gesture is entered, it may be of course changed to a state in which a change of the function executed in a foreground state is allowed. FIG. 13 illustrates such an example.

For example, when a predetermined specific touch gesture is entered, the controller 180 may switch it to a state in which a change of the function executed in a foreground state is allowed. In other words, as illustrated in the first drawing of FIG. 13, when a plurality of drag inputs 1302, 1312 converged into one position of the display unit 151 from at least two positions 1300, 1310 adjacent to the bezel of the display unit 151, namely, pinch-in inputs, are applied, the controller 180 may sense them as the user's input for changing a function (for example, camera function) currently executed in a foreground state.

In this case, the controller 180 may display at least part of the execution screens 1330, 1340 of a function (for example, camera function) currently executed in a foreground state and another function (for example, message function) adjacently arranged according to a predetermined order on the display unit 151. The second drawing of FIG. 13 illustrates such an example.

Referring to the second drawing of FIG. 13, the second drawing of FIG. 13 illustrates an example in which the execution screens 1330, 1340 of a function (for example, camera function) currently executed in a foreground state and another function (for example, message function) adjacently arranged according to a predetermined order are displayed on the display unit 151. On the other hand, in this case, the execution screens displayed on the display unit 151 may be displayed in a reduced size to a predetermined level according to the user's pinch-in input 1302, 1312 as illustrated in the second drawing of FIG. 13. Furthermore, in this state, when a swipe input 1380 is applied from one position 1370 of the display unit 151, the controller 180 may move the execution screens 1330, 1340 displayed on the display unit 151 along a direction in which the swipe input 1380 is applied. Accordingly, at least part of the execution screen 1350 of another function other than the execution screens 1330, 1340 currently displayed on the display unit 151 may be further displayed on the display unit 151. The third drawing of FIG. 13 illustrates an example of the execution screens 1330, 1340, 1350 displayed according to the applied swipe input 1380.

On the other hand, as illustrated in the third drawing of FIG. 13, the controller 180 may allow a user to select any one execution screen in a state that that the execution screens are displayed according to the swipe input 1380. In other words, as illustrated in the third drawing of FIG. 13, when a user applies a touch input to a region of the display unit 151 displayed with any one execution screen 1340, the controller 180 may determine that a recommended function corresponding to the any one execution screen 1340 has been selected by the user. Accordingly, the controller 180 may execute a recommended function selected from the user, namely, a "message function" which is a recommended function corresponding to the execution screen 1340, in a foreground state, and accordingly as illustrated in the fourth drawing of FIG. 13, the execution screen 1130 of the message function may be displayed on the display unit 151.

Figure 14:
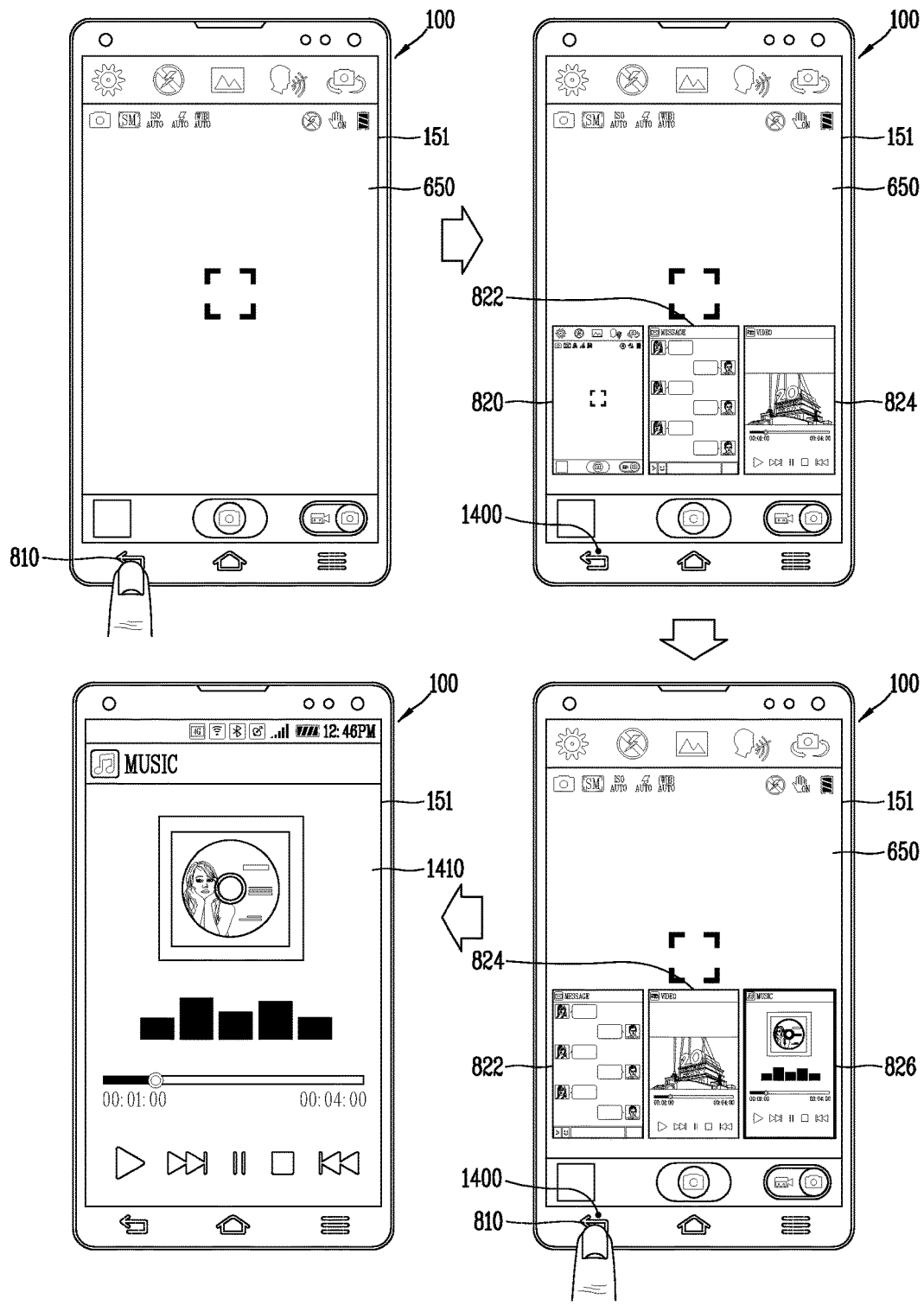

On the other hand, an example in which a function executed in the foreground state is changed according to a swipe input or flick input in a state that any one of at least one recommended functions executed in a background state is executed in a foreground state according to the user's selection has been described in the foregoing description, but a change of the function may be of course carried out by the input of a specific key. FIG. 14 illustrates an example in which a "back" key among soft keys provided in the mobile terminal 100 is assumed to be used as the "specific key." However, FIG. 14 merely describes a case where the "back" key is used as an example to described the present disclosure, but the present disclosure may not be of course necessarily limited to this. In other words, another soft key or hard key may be of course used in any way as the specific key.

Referring to FIG. 14, the controller 180 of the mobile terminal 100 according to an embodiment of the present disclosure may execute any one recommended function in a foreground state in a state that at least one recommended function is executed (in a background state) according to a time point at which a predetermined touch input is applied and the user's mobile terminal use pattern. In this case, the first drawing of FIG. 14 illustrates an example in which the function executed in a foreground state is a camera function.

When a user makes a touch to a back key 810 as illustrated in the first drawing of FIG. 14 in this state, the controller 180 may sense the user's touch input as an input for changing a function currently executed in a foreground state. Then, the controller 180 may display an execution screen of at least one different recommended function on the display unit 151. For example, the execution screens of the different recommended functions may be displayed according to an order or ranking set to the corresponding functions, respectively. The second drawing of FIG. 14 illustrates such an example.

On the other hand, when execution screens 820, 822, 824 corresponding to a plurality of recommended functions, respectively, are displayed on the display unit 151 as illustrated in the second drawing of FIG. 14, the controller 180 may change a function executed in a foreground state to a function corresponding to any one of the displayed execution screen 820, 822, 824 according to the input of a predetermined specific key, namely, back key 810.

For example, the controller 180 may execute a function corresponding to any one execution screen in a foreground state according to a number of times at which the specific key has been entered. In other words, when the specific key is entered "n" times, the controller 180 may execute a function corresponding to the n-th order or ranking from the function currently being executed in a foreground state in the foreground state. Accordingly, when the specific key is entered once, the controller 180 may execute a function corresponding to the next order or ranking of the function currently being executed in a foreground state in the foreground state.

On the other hand, when a function to be executed in a foreground state is determined according to the input of the specific key, the controller 180 may indicate it by displaying the specific key in a distinct manner. In other words, when the operation state of the mobile terminal 100 is switched to a "state in which a function executed in a foreground state is changed" according to the input of the specific key, the controller 180 may display the specific key with another color or display the specific key in a highlighted state to indicate for the user that the current operation state of the mobile terminal 100 is in a "state in which a function executed in a foreground state is changed."

Otherwise, the controller 180 may display a predetermined graphic object adjacent to the specific key. In other words, as illustrated in the second and the third drawing of FIG. 14, the controller 180 may also display an additional graphic object 1400 adjacent to the back key to indicate for the user that the current operation state of the mobile terminal 100 is in a "state in which a function executed in a foreground state is changed."

On the other hand, as illustrated in the third drawing of FIG. 14, when an execution screen of a specific recommended function is displayed according to a number of times at which the back key 810 is entered, the controller 180 may of course display an execution screen 826 corresponding to the number of times at which the back key 810 is entered to be displayed in a distinct manner from the other execution screens. In other words, the controller 180 may display the surrounding of the execution screen 826 corresponding to the number of times at which the back key 810 is entered in a different color or display the surrounding of the relevant execution screen 826 in a predetermined guideline, thereby allowing the user to identify which one is an execution screen selected according to the input of the back key 810.

On the other hand, when any one execution screen 826 is selected as described above, the controller 180 may execute a function corresponding to the selected execution screen 826 in a foreground state. The fourth drawing of FIG. 14 illustrates such an example, and it is illustrated an example of the executed screen of a music playback function displayed on the display unit 151 when the music playback function which is a function corresponding to the selected execution screen 826 is executed in a foreground state.

On the other hand, when a function executed in a foreground state is changed as described above, a function executed in a foreground state prior to the change may be executed in a background state or the execution thereof may be ended.

Here, the controller 180 may end the relevant function or execute the relevant function in a background state according to whether or not a function executed in a foreground state prior to the change is included in recommended functions determined according to a user's mobile terminal use pattern and a time point at which a change of the function executed in a foreground state is sensed. In other words, when a function executed in a foreground state prior to the change is included in recommended functions determined at a time point at which a change of the function in a foreground state is sensed, the relevant function may be changed from a state of being in a foreground state to a state of being in a background state according to the change. However, when a function executed in a foreground state prior to the change is not included in the recommended functions, the controller 180 may end the execution of the relevant function.

Accordingly, when a camera function has been executed in a foreground state prior to a change as illustrated in FIG. 14, the camera function may be executed in a background state or ended according to whether or not it is included in recommended functions determined according to a user's mobile terminal use pattern and a time point at which a change of the function executed in a foreground state is sensed.

Figure 15:
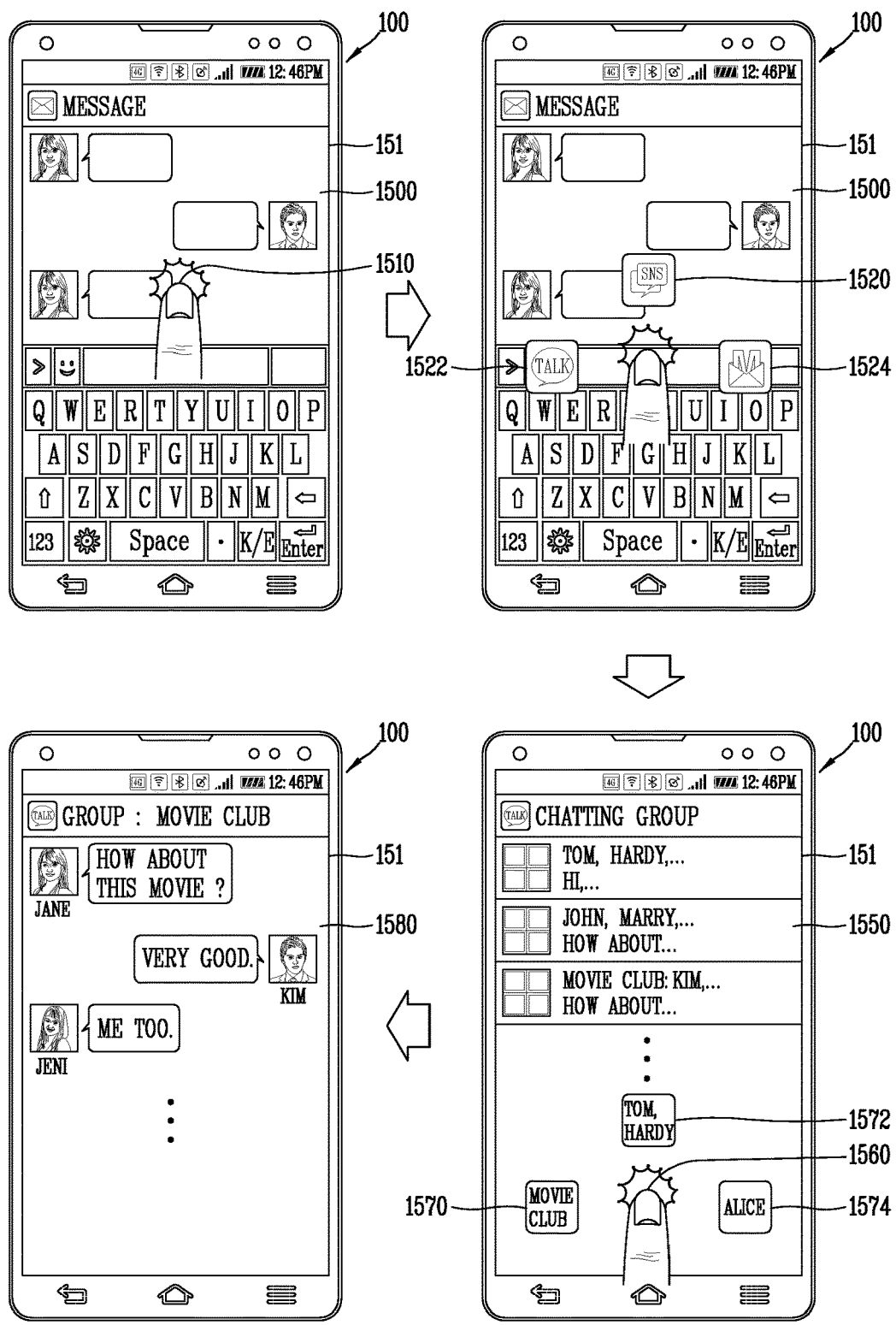
FIG. 15 is an exemplary view illustrating an example in which at least one different function is recommended based on a function currently being executed on a mobile terminal associated with the present disclosure.

On the other hand, according to the foregoing description, it has been mentioned that the mobile terminal 100 according to an embodiment of the present disclosure can preferentially determine a function associated with a currently executed function as the recommended function. Furthermore, it has been mentioned that the associated function may include a service provided through a specific function provided in the mobile terminal 100. FIG. 15 illustrates an example of such a case.

First, as illustrated in the first drawing of FIG. 15, the controller 180 may sense a predetermined user's touch input 1510 in a state that a specific function is executed. In this case, according to the present disclosure, as illustrated in FIG. 4 in the above, at least one function of the mobile terminal 100 may be selected based on a time point at which the touch input 1510 is sensed and a user's mobile terminal use pattern. Furthermore, functions associated with currently executed functions among the selected functions may be preferentially selected as the recommended function over the non-associated functions.

For an example, when a function currently being executed in the mobile terminal 100 according to an embodiment of the present disclosure is a message function, a function associated with the message function, namely, different SNS functions and a multi-mail message function, may be selected as the recommended function. In this case, the controller 180 may execute the multi-mail message function, and execute the different SNS functions in a state capable of accessing SNS communities set to the different SNS functions, respectively. Here, the controller 180 may execute the SNS functions and the multi-mail message function in a background state.

Furthermore, the controller 180 may display graphic objects 1520, 1522, 1524 corresponding to each function selected as currently recommended functions adjacent to one position of the display unit 151 on which the touch input 1510 is sensed as illustrated in the second drawing of FIG. 15. Furthermore, when the graphic objects of the recommended functions are displayed on the display unit 151, the controller 180 may allow the user to select any one graphic object. For example, the controller 180 may determine that any one of the graphic objects 1520, 1522, 1524 is selected based on a touch input sensed in any one of regions of the display unit 151 displayed with the graphic objects 1520, 1522, 1524 or determine that any one of the graphic objects 1520, 1522, 1524 is selected based on the direction of a drag input applied subsequent to the touch input 1510 or one position of the display unit 151 at which the drag input is ended.

Then, the controller 180 may a function corresponding to any one graphic object determined to be selected in a foreground state. In other words, when the selected graphic object 1522 corresponds to an SNS function, the controller 180 may execute an SNS function corresponding to the graphic object 1522 in a foreground state. Accordingly, a screen on which an SNS function corresponding to the graphic object 1522 is executed may be displayed on the display unit 151, and as illustrated in the third drawing of FIG. 15, a screen associated with SNS communities set to an SNS function corresponding to the graphic object 1522 may be displayed on the display unit 151.

On the other hand, the controller 180 may sense whether or not there is a predetermined user's touch input in a state that that a specific function is executed as described above.

Furthermore, as illustrated in the third drawing of FIG. 15, when there is a predetermined user's touch input 1560, the controller 180 may execute at least one recommended function determined based on the touch input 1560 and display graphic objects corresponding to the executed functions, respectively, on the display unit 151. Furthermore, here, at least one recommended function determined based on the touch input 1560 may include a service provided through a currently executed function.

For example, in case of an SNS function, it may be possible to provide a chatting service with a specific group formed through the same SNS function or a specific person capable of exchanging a message through the same SNS function. Accordingly, when a predetermined touch input 1560 is applied in a state that a specific SNS function is executed, the controller 180 may execute a chatting service with a specific group or specific person provided through the specific SNS function as a recommended function at the time of the predetermined touch input 1560.

In other words, the controller 180 may detect a specific group or specific person that has chatted with a user more than a predetermined number of times at a time point at which the touch input 1560 is applied based on the use record of the SNS function. Furthermore, the controller 180 may execute a chatting service with a specific group or specific person as a recommended function. Here, the execution of the chatting service may be accessing a chat room previously formed for the detected specific group or specific person or opening a chat room with the detected specific group or specific person.

On the other hand, at least one of the chatting services may be executed according to a number of the detected specific groups or specific persons. Furthermore, the execution of the chatting services may be in a background state. Furthermore, the controller 180 may display graphic objects 1570, 1572, 1574 corresponding to currently executed chatting services, respectively, on the display unit 151 as illustrated in the third drawing of FIG. 15. Here, the graphic objects 1570, 1572, 1574 may be of course displayed adjacent to one position of the display unit 151 at which the touch input 1560 is sensed.

On the other hand, in this state, the controller 180 may select any one graphic object according to the user's selection. Furthermore, the controller 180 may display a chatting service screen corresponding to the selected graphic object on the display unit 151. In other words, for example, when a graphic object 1570 corresponding to a chatting service with "Movie Club," which is a specific SNS community group, is selected from the graphic objects 1570, 1572, 1574, the controller 180 may execute a chatting service with a group named as the "Movie Club" in a foreground state among currently executed SNS functions. Furthermore, a screen that has accessed a chat room previously formed for a group named as the "Movie Club" on the display unit 151. The fourth drawing of FIG. 15 illustrates such an example.

On the other hand, an example in which a service that can be provided through an SNS function is executed as a recommended function during the execution of the SNS function in the description of FIG. 15 in the above, but it is merely an example for describing the present disclosure, and the present disclosure may not be of course necessarily limited to this. In other words, a service that can be provided through a different function may be provided as a recommended function in any way.

In other words, for example, the controller 180 may execute recommended functions including an Internet access function in a background state based on a user's predetermined touch input, and execute the Internet access function in a foreground state according to the user's selection. When a predetermined touch input is entered again in this state, the controller 180 may access a plurality of different portal services through the Internet access function, and display graphic objects corresponding to services that have accessed the plurality of different portal services on the display unit 151 in response to the predetermined touch input. Here, access to the plurality of different portal services may be executed in a background state.

On the other hand, when a user selects a graphic object corresponding to any one portal service access in this state, the controller 180 may display a screen that has accessed a portal service corresponding to the selected graphic object on the display unit 151 and execute an access to a portal service corresponding to the selected graphic object in a foreground state. Accordingly, the controller 180 may receive a user's input or perform a search through a portal service access screen corresponding to the selected graphic object.

On the other hand, when the predetermined touch input is applied again in this state, the controller 180 may access a plurality of different webpages accessed through currently accessed portal services. Furthermore, the controller 180 may display graphic objects corresponding to services that have accessed the different webpages in response to the predetermined touch input. Here, access to the plurality of different webpages may be executed in a background state. Furthermore, when a user selects a graphic object corresponding to any one webpage, the controller 180 may display a screen that has accessed a webpage corresponding to the selected graphic object on the display unit 151 and perform a search through a webpage corresponding to the selected graphic object.

On the other hand, contrary to the foregoing description, when a predetermined touch input is sensed in a state that an Internet access function is executed, the controller 180 may first, of course, access different webpages, and display graphic objects corresponding to the accessed webpages on the display unit 151. Furthermore, when any one webpage is selected, the controller 180 may display the resultant screen on the display unit 151. Furthermore, when a predetermined touch input is sensed again in a state that a specific webpage is accessed, the controller 180 may of course access different portal sites covering the same or similar subject as or to a currently accessed webpage, and display graphic objects corresponding to the accessed state adjacent to a position of the display unit 151 on which the touch input is sensed. Furthermore, in this case, when the user selects any one graphic object, a screen that has accessed a different portal site covering the same or similar subject as or to a currently accessed webpage may be of course displayed on the display unit 151.

The effects of a mobile terminal according to the present disclosure and a control method thereof will be described as follows.

According to at least one of the embodiments of the present disclosure, the present disclosure may recommend at least one function according to a specific time point based on a time point at which a user's touch input is applied and a result of analyzing the user's mobile terminal use pattern, thereby having an advantage of allowing the user to more quickly find his or her desired mobile terminal function.

Furthermore, according to at least one of the embodiments of the present disclosure, the present disclosure may execute a plurality of mobile terminal functions in response to a user's predetermined touch input, and display the corresponding graphic objects, and display an execution screen corresponding to the selected any one of them in response to the touch input, thereby having an advantage of allowing the user to more quickly use his or her desired function.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a display;
a sensing unit; and
a controller coupled to the display and the sensing unit, the controller configured to:
cause the display to display a first screen;
identify a predetermined touch input according to a first touch input sensed by the sensing unit while the first screen is displayed;
execute functions in a background state according to a usage pattern and an actual time of day at which the first touch input is sensed by the sensing unit, wherein the functions are executed before any of the functions are selected by a user
cause the display to display an execution screen for each of the executed functions in response to the first touch input, wherein the displaying of the execution screen for each of the executed functions permits identification that the functions are executed in the background state; and
cause the display to display a first execution screen in a foreground state in response to a second touch input selecting a first one of the execution screens of the functions executing in the background state.

2. The mobile terminal of claim 1, wherein the usage pattern is frequency at which the executed functions are executed relative to other functions among a plurality of functions.

3. The mobile terminal of claim 2, wherein ranking of the execution screens of the functions executing in the background state is determined according to a recommended ranking of the executed functions, and wherein
the recommended ranking is determined according to the frequency at which the executed functions are executed relative to other functions among the plurality of functions.

4. The mobile terminal of claim 3, wherein the controller is further configured to:
cause the display to display in the foreground state a second execution screen of any one of the executed functions which has a highest recommended ranking.

5. The mobile terminal of claim 4, wherein the controller is further configured to:

cause the display in the foreground state to terminate the displaying of the second execution screen and display in a foreground state a third execution screen of a function that is a next recommended ranking relative to the executed function of the second execution screen, in response to a third touch input.

6. The mobile terminal of claim 1, wherein the first touch input is an input received at a specific key of the mobile terminal, and wherein
the specific key is any one of a hard key or a soft key.

7. The mobile terminal of claim 6, wherein the controller is further configured to:
cause the display in the foreground state to change which execution screen, among the execution screens, is displayed in a foreground state on the display according to repeated input to the specific key.

8. The mobile terminal of claim 1, wherein the controller is further configured to:
cause the display to display the specific key in a distinct manner relative to displaying of the specific key prior to receiving the first touch input to indicate that a currently displayed execution screen in a foreground state can be changed to another execution screen among the execution screens.

9. The mobile terminal of claim 1, wherein the controller is further configured to:
cause the display to display a lock screen prior to receiving the first touch input, wherein the lock screen indicates that the mobile terminal is in a state in which functionality of the plurality of functions is limited; and
cause the display to display a graphic object corresponding to any one of the executed functions in response to user input for releasing the locked state.

10. The mobile terminal of claim 9, wherein the controller is further configured to:
cause the display to display the graphic object when the user input for releasing the locked state is a drag input with a defined drag trajectory, and wherein
the displayed location of the graphic object changes according to changes in the drag input.

11. The mobile terminal of claim 9, wherein the controller is further configured to:
cause the display to display the graphic object according to a period of time for which the user input for releasing the locked state is held at one position of the display.

12. The mobile terminal of claim 9, wherein the controller is further configured to:
cause the display to display the graphic object adjacent to a position of the display at which the first touch input is sensed.

13. The mobile terminal of claim 1, wherein the controller is further configured to:
terminate the executing of remaining functions after a defined time period.

14. The mobile terminal of claim 1, wherein the usage pattern includes a number of times that each of the plurality of functions has been executed during a defined time interval.

15. The mobile terminal of claim 1, wherein the executed functions are services executed through an application or program installed in the mobile terminal.

16. A display method for a mobile terminal having a display, the method comprising:
displaying, on the display, a first screen;
identifying a predetermined touch input according to a first touch input received while the first screen is displayed;

executing functions in a background state according to a usage pattern and an actual time of day at which the first touch input is received, wherein the functions are executed before any of the functions are selected by a user;

displaying, on the display, an execution screen for each of the executed functions in response to the first touch input, wherein the displaying of the execution screen for each of the executed functions permits identification that the functions are executed in the background state; and displaying, on the display, a first execution screen in a foreground state in response to a second touch input selecting a first one of the execution screens of the functions executing in the background state.

17. The method of claim 16, wherein the usage pattern is frequency at which the executed functions are executed relative to other functions among a plurality of functions.

\* \* \* \* \*